(12) United States Patent
Knaeble

(10) Patent No.: US 10,922,999 B2
(45) Date of Patent: *Feb. 16, 2021

(54) INSTRUCTIONAL TOOL FOR TEACHING STATISTICS CONCEPTS

(71) Applicant: Utah Valley University, Orem, UT (US)

(72) Inventor: Brian Robert Knaeble, Sandy, UT (US)

(73) Assignee: Utah Valley University, Orem, UT (US)

( * ) Notice: Subject to any disclaimer, the term of this patent is extended or adjusted under 35 U.S.C. 154(b) by 206 days.

This patent is subject to a terminal disclaimer.

(21) Appl. No.: 16/222,927

(22) Filed: Dec. 17, 2018

(65) Prior Publication Data

US 2019/0122580 A1 Apr. 25, 2019

Related U.S. Application Data

(63) Continuation-in-part of application No. 14/863,421, filed on Sep. 23, 2015, now Pat. No. 10,157,551.

(60) Provisional application No. 62/054,217, filed on Sep. 23, 2014.

(51) Int. Cl.
*G09B 23/02* (2006.01)
*G09B 19/02* (2006.01)
*G09B 19/18* (2006.01)

(52) U.S. Cl.
CPC ............ *G09B 23/02* (2013.01); *G09B 19/02* (2013.01); *G09B 19/18* (2013.01)

(58) Field of Classification Search
CPC ......... G09B 19/02; G09B 19/18; G09B 23/02
See application file for complete search history.

(56) References Cited

U.S. PATENT DOCUMENTS

| | | |
|---|---|---|
| 4,900,255 A | 2/1990 | Laghi |
| 5,066,233 A | 11/1991 | Laghi |
| 5,080,592 A | 1/1992 | Laghi |

(Continued)

OTHER PUBLICATIONS

Video, Normal Distribution Demonstration (Bean Machine Script for Physion), https://www.youtube.com/watch?v=PM7z_03o_kk, Aug. 23, 2011, p. 1.

(Continued)

*Primary Examiner* — Eddy Saint-Vil
(74) *Attorney, Agent, or Firm* — Kunzler Bean & Adamson; Bruce R. Needham

(57) ABSTRACT

An apparatus for teaching statistics concepts includes a simulation module that generates a simulation of subject elements moving from a first portion of a simulated space to a second portion of the simulated space, where the simulated space has a treatment path and a non-treatment path. A propensity module utilizes one or more propensity inputs to the simulation module to affect a propensity of the subject elements to move on the treatment path to have treatment functions applied. A treatment module applies the treatment functions to the subject elements moving on the treatment path, where the treatment functions are configured to affect at least one output measure of the subject elements. A display module displays the simulation of the subject elements having the propensity inputs applied, application of the treatment functions, and the at least one output measure.

20 Claims, 31 Drawing Sheets

(56) References Cited

U.S. PATENT DOCUMENTS

| | | | |
|---|---|---|---|
| 5,690,591 | A | 11/1997 | Kenmochi et al. |
| 2009/0100928 | A1 | 4/2009 | Fry et al. |
| 2009/0259444 | A1* | 10/2009 | Dolansky ............ G05B 19/4069 703/2 |
| 2014/0060149 | A1 | 3/2014 | Alhusain |

OTHER PUBLICATIONS

Math is Fun, "Quincunx", https://www.mathsisfun.com/data/quincunx.html. website, p. 1.
Hirano & Imbens, "The Propensity Score with Continuous Treatments", Feb. 7, 2004, pp. 1-13.
"Statistical Applets Confidence Intervals", http://digitalfirst.bfwpub.com/stats_applet/stats_applet_4_ci.html, p. 1.
"Statisitical Applets Confidence Intervals for Proportions", digitalfirst.bfwpub.com/stats_applet/stats_applet_20_ciprop.html, p. 1.
"Statistical Applets Correlation and Regression", http://digitalfirst.bfwpub.com/stats_applet/stats_applet_5_correg.html, p. 1.
"Statistical Applets Mean and Median", http://digitalfirst.bfwpub.com/stats_applet/stats_applet_6_meanmed.html, p. 1.
"Statistical Applets Normal Approximation to Binomial Distributions", http://digitalfirst.bfwpub.com/stats_applet/stats_applet_2_cltbinom.html, p. 1.
"Statistical Applets Normal Density Curve", http://digitalfirst.bfwpub.com/stats_applet/stats_applet_7_norm.html, p. 1.
"Statistical Applets One-Variable Statistical Calculator", http://digitalfirst.bfwpub.com/stats_applet/stats_applet_8_ovc.html, p. 1.
"Statistical Applets One-way ANOVA", http://digitalfirst.bfwpub.com/stats_applet/stats_applet_1_anova.html, p. 1.
"Statistical Applets Probability", http://digitalfirst.bfwpub.com/stats_applet/stats_applet_10_prob.html, p. 1.
"Statistical Applets Simple Random Sample", http://digitalfirst.bfwpub.com/stats_applet/stats_applet_13_srs.html, p. 1.
"Statistical Applets Satistical Power", http://digitalfirst.bfwpub.com/stats_applet/stats_applet_9_power.html, p. 1.
"Statistical Applets the Law of Large Numbers", http://digitalfirst.bfwpub.com/stats_applet/stats_applet_11_largenums.html, p. 1.
"Statistical Applets the Reasoning of a Statistical Test", http://digitalfirst.bfwpub.com/stats_applet/stats_applet_15_reasoning.html, p. 1.
"Statistical Applets Two-Variable Statistical Calculator", http://digitalfirst.bfwpub.com/stats_applet/stats_applet_16_tvc.html, pp. 1-5.
"Beam Machine", Wikipedia, Apr. 2, 2014, pp. 1-2.
"Statistical Applets the Central Limit Theorem", http://digitalfirst.bfwpub.com/stats_applet/stats_applet_3_cltmean.html, p. 1.
"Statistical Applets P-Value of a Test of Significance", http://digitalfirst.bfwpub.com/stats_applet/stats_applet_12_pvalue.html, p. 1.
"Statistical Applets Statistical Significance", http://digitalfirst.bfwpub.com/stats_applet/stats_applet_14_signif.html, p. 1.
"Statistical Applets the Chi-square Goodness of Fit Test", http://digitalfirst.bfwpub.com/stats_applet/stats_applet_19_chisquare.html, p. 1.
"Statistical Applets Statistical Significance for One Proportion", http://digitalfirst.bfwpub.com/stats_applet/generic_stats_applet_21_sigprop.html, p. 1.
"Statistical Applets P-value for a Test of One Proportion", http://digitalfirst.bfwpub.com/stats_applet/generic_stats_applet_22_pvalprop.html, p. 1.
"Statistical Applets Sampling Distribution of a Proportion", http://digitalfirst.bfwpub.com/stats_applet/generic_stats_applet_24_sampdistprop.html, p. 1.
"Statistical Applets Probability 2 (the roulette wheel)", http://digitalfirst.bfwpub.com/stats_applet/generic_stats_applet_23_probroulette.html, p. 1.
"Statistical Applets Distribution of the one-sample t statistic", http://digitalfirst.bfwpub.com/stats_applet/stats_applet_distributionoftheonesampletstatistic.html, p. 1.

* cited by examiner

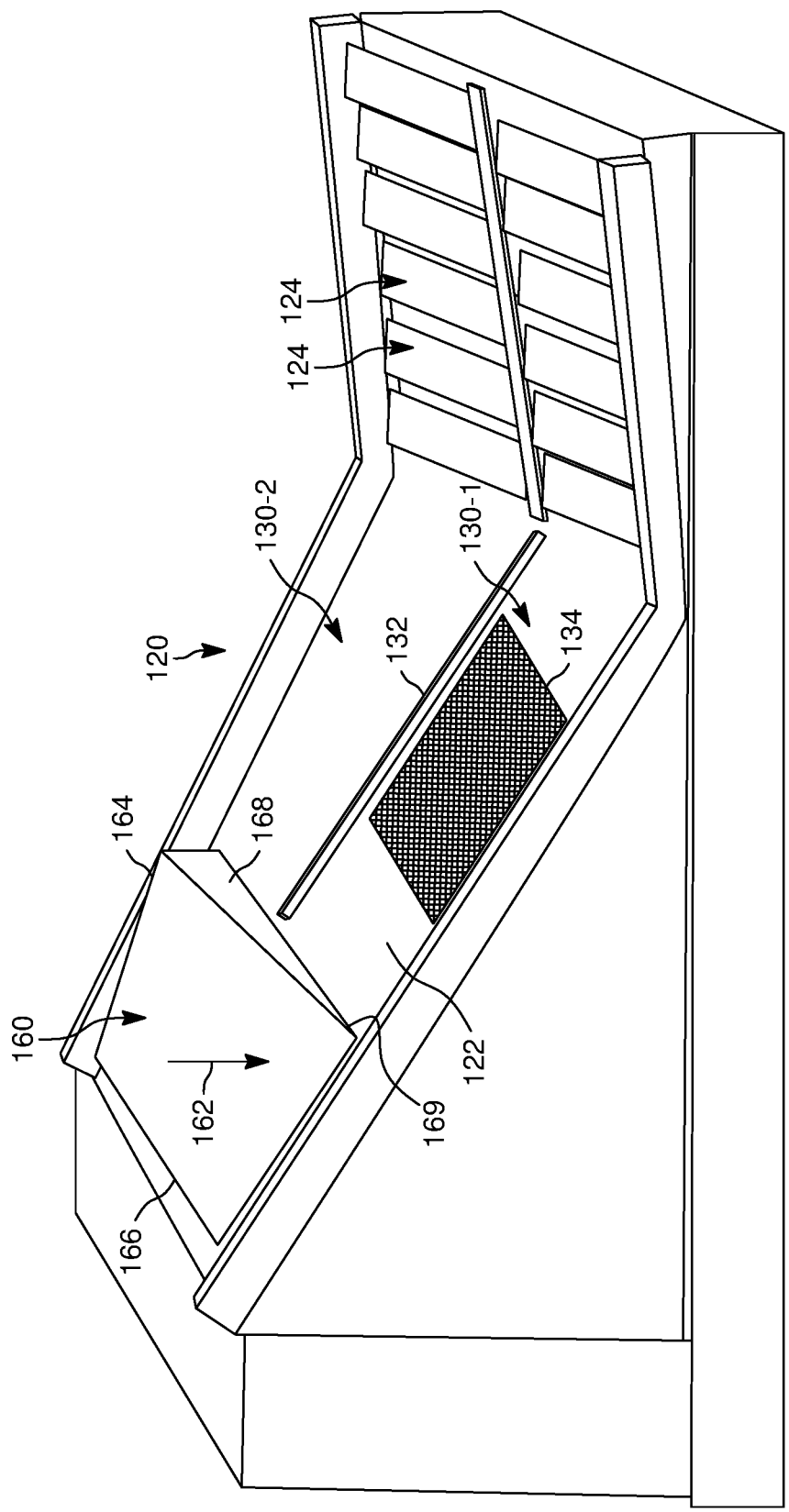

| | WEIGHT H | WEIGHT L | FRICTION H | FRICTION L | SIZE L | SIZE S | PROPENSITY VALVE |
|---|---|---|---|---|---|---|---|
| A | X | | | X | X | | .8 |
| B | | X | X | | | X | .2 |
| C | X | X | X | | X | | .6 |
| D | X | X | | X | | X | .4 |
| E | | | X | | X | | .6 |
| F | | X | | X | X | X | .4 |
| G | | X | | X | | | .5 |
| H | | X | | X | | X | .4 |
| I | X | | | | | X | .7 |
| J | X | | X | | X | | .6 |
| K | X | X | X | | X | | .3 |
| L | | | | X | | X | .7 |

US 10,922,999 B2

INSTRUCTIONAL TOOL FOR TEACHING STATISTICS CONCEPTS

CROSS-REFERENCES TO RELATED APPLICATIONS

This is a continuation-in-part application of and claims priority to U.S. patent application Ser. No. 14/863,421 entitled "INSTRUCTIONAL TOOL FOR TEACHING STATISTICS CONCEPTS" and filed on Sep. 23, 2015 for Brian Robert Knaeble, which claims priority to U.S. Provisional Application No. 62/054,217 filed Sep. 23, 2014 and entitled "INSTRUCTIONAL TOOL FOR TEACHING STATISTICAL CONCEPTS," for Brian Robert Knaeble, which are both incorporated herein by reference for all purposes.

FIELD

This invention relates to instructional tools and more particularly relates to an Instructional Tool For Teaching Statistics Concepts.

BACKGROUND

Statistics concepts are often taught using terms and formulas through traditional teaching methods. Students can have a hard time understanding the effect of various inputs on a subject population. Traditional teaching methods do not allow for students to conceptually visualize various statistics concepts and effects of treatment on subject populations having different characteristics.

SUMMARY

The present application relates to a tool for teaching statistics concepts. The tool utilizes various propensity inputs and treatments to simulate outcome responses for subject elements. In illustrated embodiments, the subject elements have the same or similar characteristics and outcome response while in other embodiments the subject elements have different characteristics and outcome responses. The tool applies various propensity inputs and treatments and provides an output measure or score distribution to illustrate different statistics concepts.

An instructional tool for teaching statistics concepts is disclosed. In one embodiment the tool comprises mechanical structures and uses various propensity inputs and treatments to simulate outcome responses for subject elements. In various embodiments, the subject elements at the same or similar characteristics and outcome response while another embodiments, the subject elements of different characteristics and outcome responses. The instructional tool applies various propensity inputs and treatments and provides an output measure or score distribution to illustrate different statistics concepts.

A computer simulation apparatus for teaching statistics concepts is disclosed. One embodiment of the apparatus includes a simulation module that generates a simulation of one or more subject elements moving from a first portion of a simulated space to a second portion of the simulated space, where the simulated space has a treatment path and a non-treatment path. The apparatus includes a propensity module that utilizes one or more propensity inputs to the simulation module to affect a propensity of the one or more subject elements to move on the treatment path to have one or more treatment functions applied. The apparatus further includes a treatment module that applies the one or more treatment functions to the one or more subject elements moving on the treatment path, wherein the one or more treatment functions are configured to affect at least one output measure of the one or more subject elements and a display module that displays the simulation of the one or more subject elements having the propensity inputs applied, application of the one or more treatment functions, and the at least one output measure. In various embodiments, at least a portion of said modules comprises one or more of hardware circuits, a programmable hardware device and executable code, the executable code stored on one or more computer readable storage media.

A method for teaching statistics concepts is disclosed, in one embodiment the method includes generating a simulation of one or more subject elements moving from a first portion of a simulated surface to a second portion of the simulated surface, where the simulated surface has a treatment path and a non-treatment path. The method utilizes one or more propensity inputs to affect a propensity of the one or more subject elements to move on the treatment path to have one or more treatment functions applied. The method applies the one or more assigned treatment functions to the one or more subject elements moving on the treatment path, wherein the one or more assigned treatment functions are configured to affect at least one output measure of the one or more subject elements and displays the simulation of the one or more subject elements having the propensity inputs applied, application of the one or more treatment functions, and the at least one output measure. A computer program product is disclosed that, in one embodiment, implements the method and/or the functions of the apparatus.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 2F illustrates an embodiment of the ramp structure shown in FIG. 2A utilizing a laterally sloped structure to provide a biased propensity and confounding input mechanism for subject elements.

DETAILED DESCRIPTION

Figure 1:
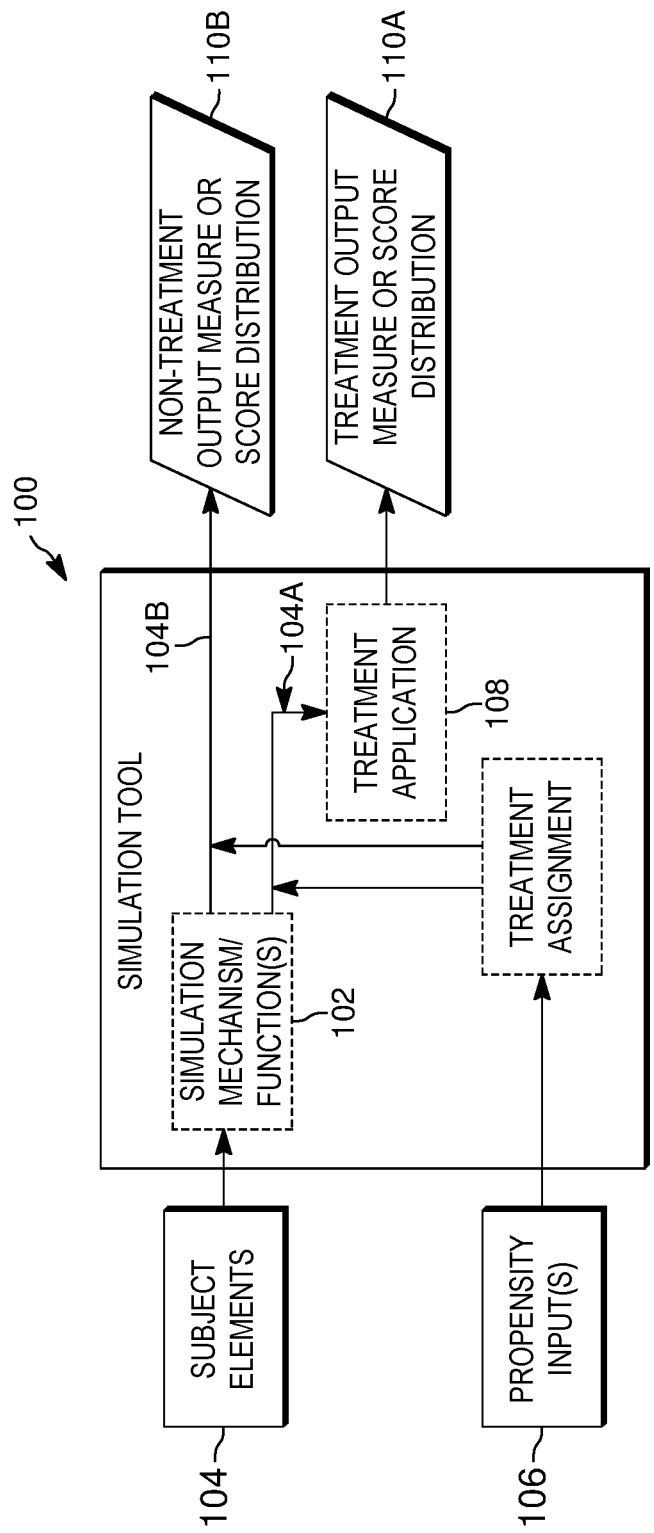
FIG. 1 is a schematic illustration of one embodiment of an instructional tool for illustrating different statistics concepts.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

An apparatus for teaching statistics concepts includes a simulation module that generates a simulation of one or more subject elements moving from a first portion of a simulated space to a second portion of the simulated space, where the simulated space has a treatment path and a non-treatment path. The apparatus includes a propensity module that utilizes one or more propensity inputs to the simulation module to affect a propensity of the one or more subject elements to move on the treatment path to have one or more treatment functions applied. The apparatus includes a treatment module that applies the one or more treatment functions to the one or more subject elements moving on the treatment path, where the one or more treatment functions are configured to affect at least one output measure of the one or more subject elements. The apparatus includes a display module that displays the simulation of the one or more subject elements having the propensity inputs applied, application of the one or more treatment functions, and the at least one output measure.

In some embodiments, the simulation module generates the simulated space as a surface having characteristics of an inclined plane and wherein the one or more subject elements are simulated as balls having predetermined attributes. In other embodiments, the propensity inputs comprise an array of simulated pegs on the simulated surface having an alternating offset pattern that imparts at least some randomization to a horizontal movement of the one or more subject elements. In other embodiments, the treatment module simulates one or more treatment functions as characteristics of at least part of the treatment path that affect a simulated momentum of the one or more subject elements.

In some embodiments, the propensity inputs include one or more attributes that affect the propensity of the one or more subject elements to move along the treatment path. In other embodiments, the apparatus includes a stratification module, that stratifies a population of the one or more subject elements into substantially homogeneous subgroups based on the one or more propensity inputs of the subject elements within a subgroup substantially matching. In other embodiments, the apparatus includes a statistics module that displays one or more statistics measures for the at least one output measure of the one or more subject elements, where the statistics module is configured to selectively compute and display the statistics measures for the subgroups.

In some embodiments, the at least one output measure includes at least one of an output distance and a score distribution. In other embodiments, a simulated ending position of the one or more subject elements in the at least one output measure is related to a simulated efficacy of the one or more treatment functions. In other embodiments, one or more treatment functions are applied to the one or more moving subject elements in response to a user action performed on the one or more moving subject elements. In other embodiments, the user action is selected from a mouse click, a touchscreen tap, a touchscreen gesture, a voice input, and combinations thereof.

A method for teaching statistics concepts includes generating a simulation of one or more subject elements moving from a first portion of a simulated surface to a second portion of the simulated surface, where the simulated surface has a treatment path and a non-treatment path. The method includes utilizing one or more propensity inputs to affect a propensity of the one or more subject elements to move on the treatment path to have one or more treatment functions applied. The method includes applying the one or more assigned treatment functions to the one or more subject elements moving on the treatment path, where the one or more assigned treatment functions are configured to affect at least one output measure of the one or more subject elements, and displaying the simulation of the one or more subject elements having the propensity inputs applied, application of the one or more treatment functions, and the at least one output measure.

In some embodiments, the simulated space includes characteristics of an inclined plane and where the one or more subject elements are simulated as balls having predetermined attributes. In other embodiments, the propensity inputs include an array of simulated pegs on the simulated surface having an alternating offset pattern that imparts at least some randomization to a horizontal movement of the one or more subject elements. In other embodiments, the one or more treatment functions are applied to the one or more moving subject elements in response to a user action performed on the one or more moving subject elements. In other embodiments, the user action is selected from a mouse click, a touchscreen tap, a touchscreen gesture, a voice input, and combinations thereof.

In some embodiments, the one or more treatment functions are simulated as characteristics of at least part of the treatment path that affect a simulated momentum of the one or more subject elements. In other embodiments, the propensity inputs include one or more attributes that affect the propensity of the one or more subject elements to move along the treatment path. In other embodiments, the method includes stratifying the one or more subject elements into substantially homogeneous subgroups based on the one or more attributes substantially matching.

A computer program product for teaching statistics concepts includes a computer readable storage medium having program instructions embodied therewith. The program instructions are executable by a processor to cause the processor to generate a simulation of one or more subject elements moving from a first portion of a simulated surface to a second portion of the simulated surface, where the simulated surface has a treatment path and a non-treatment path. The program instructions are executable by a processor to cause the processor to utilize one or more propensity inputs to affect a propensity of the one or more subject elements to move on the treatment path to have one or more treatment functions applied. The program instructions are executable by a processor to cause the processor to apply the one or more assigned treatment functions to the one or more subject elements moving on the treatment path, where the one or more assigned treatment functions are configured to affect at least one output measure of the one or more subject elements, and to display the simulation of the one or more subject elements having the propensity inputs applied, application of the one or more treatment functions, and the at least one output measure.

FIG. 1 depicts one embodiment of an instructional tool 100 for teaching statistics concepts. In one embodiment, the instructional tool 100 allows the user to simulate (mechanically or by computer simulation) the effects of various treatments on various populations using different treatment inputs and treatment propensity inputs to observe and analyze the output results for different simulations. As schematically shown in FIG. 1, embodiments of the tool 100 include simulation mechanism(s) (e.g., mechanical structures) or functions (e.g., computer models) 102 to provide an output measure or score for subject elements 104 responsive to characteristics of the subject elements 104. As shown, in some embodiments the tool 100 utilizes a propensity input 106 to assign selected subject elements 104A to a treatment application 108 while non-selected subject elements 104B are not subject to the treatment application 108. Treatment is applied to change a magnitude, e.g., increase or decrease an output measure/score of subject elements to provide an output measure/score distribution 110A for the selected subject elements 104A and an output measure/score distribution 110B for the non-selected subject elements 104B. In illustrated embodiments, the treatment inputs from the treatment application 108 additively or negatively affect the output measure or score for the treated subject elements 104A. The subject elements 104 include sets of subject elements with common characteristics that provide the same or similar output response to simulation and treatment inputs and subject elements 104 with different characteristics that provide different output responses to simulation and treatment inputs. As will be described herein, the different treatment inputs and sets of subject elements are used to illustrate different treatments and outcomes for different subject populations.

In certain embodiments, a computer simulation is implemented to simulate mechanisms and motions based on principles of physics, mathematics, and mechanical movements. Any of a variety of simulation programming techniques, source code libraries and algorithms may be used to implement one or more modules of a computer simulator. For example, in mechanical cars on driving on a smooth track or on a rocky mountain road behave and respond according to principles of physics, mathematics, mechanical movements, and so forth. Simulation techniques and programming code based on such principles can be used to simulate the action of cars of different sizes, speeds, and other characteristics driving over a variety of surfaces.

The computer simulation models and modules describe herein may be programmed to graphically depict actions of simulated subject elements having a variety of attributes and interacting with different environments. For example, in some embodiments, programming code and computer simulation models may be used implement the instructional tool 100 by simulating the attributes of the subject elements 104 and the interaction of the subject elements 104 with the simulation mechanisms and/or functions 102. Accordingly, in some embodiments, the simulation tool 100 includes a number of modules that implement a computer simulation model that can simulate the attributes of the subject elements 104 and the responses of the subject elements 104 to the mechanisms and/or functions 102 substantially as described with respect to FIGS. 2A-2C, 3A-3K, 4, 5A-5C, 6A-6C, and 7A-7C.

Moreover, in various embodiments, the simulation tool 100 improves instructional technology by facilitating simulation of attributes of the subject elements 104 and responses of the subject elements 104 to simulation mechanism and/or functions 102 that are not easily models using mechanical models. For example, in some embodiments, a user of a computer embodiment of the instructional tool 100 may click, tap, or swipe or a graphical representation of one or more of the subject elements 104 to directly perform treatment application 108. Similarly, a user of a computer simulation embodiment of the instructional tool 100 may enter the propensity inputs 106 by selecting them from a menu or by performing game-like actions to provide the propensity inputs 106.

Additionally, in some embodiments, implementing the simulation tool as a computer simulation improves the instructional technology by allowing a user to perform treatment assignment of population subgroups of subject elements having one or more matching characteristics, even if the matching characteristics of the elements within a subgroup are characteristics that would have no effect on propensity in a mechanical simulation. For example, in mechanical simulation, ball size or weight would be expected to have at least some influence on the horizontal movement of a ball toward or away from a treatment path, but color would not be expected to have such an influence. However, color is a characteristic that is easily identifiable. In a computer simulation, a user may assign a first subgroup of simulated subject elements e.g., 104a depicted as white balls to move along a treatment path and/or to directly receive the treatment application 108 and a second subgroup of simulated subject elements e.g., 104b depicted as striped balls to move along a non-treatment path and/or to forego or bypass the treatment application 108 and may do so without necessarily having to link the color subgroups to a characteristic that influences movement such as weight, size, friction etc.

Further, in certain embodiments, implementing the simulation tool 100 using computer models and modules enables a user (e.g., a student and/or an instructor) to simulate the propensity inputs 106, the treatment assignment to a subgroup 104A of subject elements moving along a treatment path to receive a treatment application 108 or a different subgroup 104B moving on a non-treatment path to include complex combinations of attributes and/or inputs that would not easily be possible to model using only the mechanism available in a mechanical embodiment of the simulation tool 100. For example, in embodiments implemented as a computer simulation, certain medical, economic, or social scientific scenarios may be mapped to a complex combination of balls, even though the situation itself is not physical. For instance, economists may analyze data to estimate the effects of a government economic stimulus. Individual citizens exposed to the stimulus may have better financial outcomes i.e., output measures, but they too might differ from those not exposed to the stimulus in non-trivial ways like age and occupation. In embodiments in which the instructional tool is implemented as a computer simulation, the age and occupation may be easily mapped to "speed" and "color" in the computer simulation.

Moreover, a computer simulation is more reliable and more reproducible. If a subtle effect of a complex combination is desired, the mechanical device may fail to produce the effect even though the user is meticulous in preparing the inputs. Similarly, a mechanical simulation model is subject to physical wear out and failure mechanisms, but a computer simulation is not and is therefore more reliable.

In some embodiments, a user may perform a computer simulated experiment in which the user provides propensity inputs 106 based on attributes that are arbitrary or that would not normally impart a propensity or probability to a subject element 104a to have a treatment application 108. For example, the user may provide a propensity input that balls that are large, white, and furry have a 10% probability of receiving the treatment application 108 while balls that are small, striped, and jelly-filled have a 60% probability of receiving the treatment application 108. Accordingly, in some embodiments, implementing the simulation tool 100 as a computer simulation that allows a user to assign or graphical represent inputs and/or attributes that are unusual, humorous, or otherwise unconventional can improve the ability of the simulation user to remember the simulation experiment and the principles being taught.

Figure 2A:
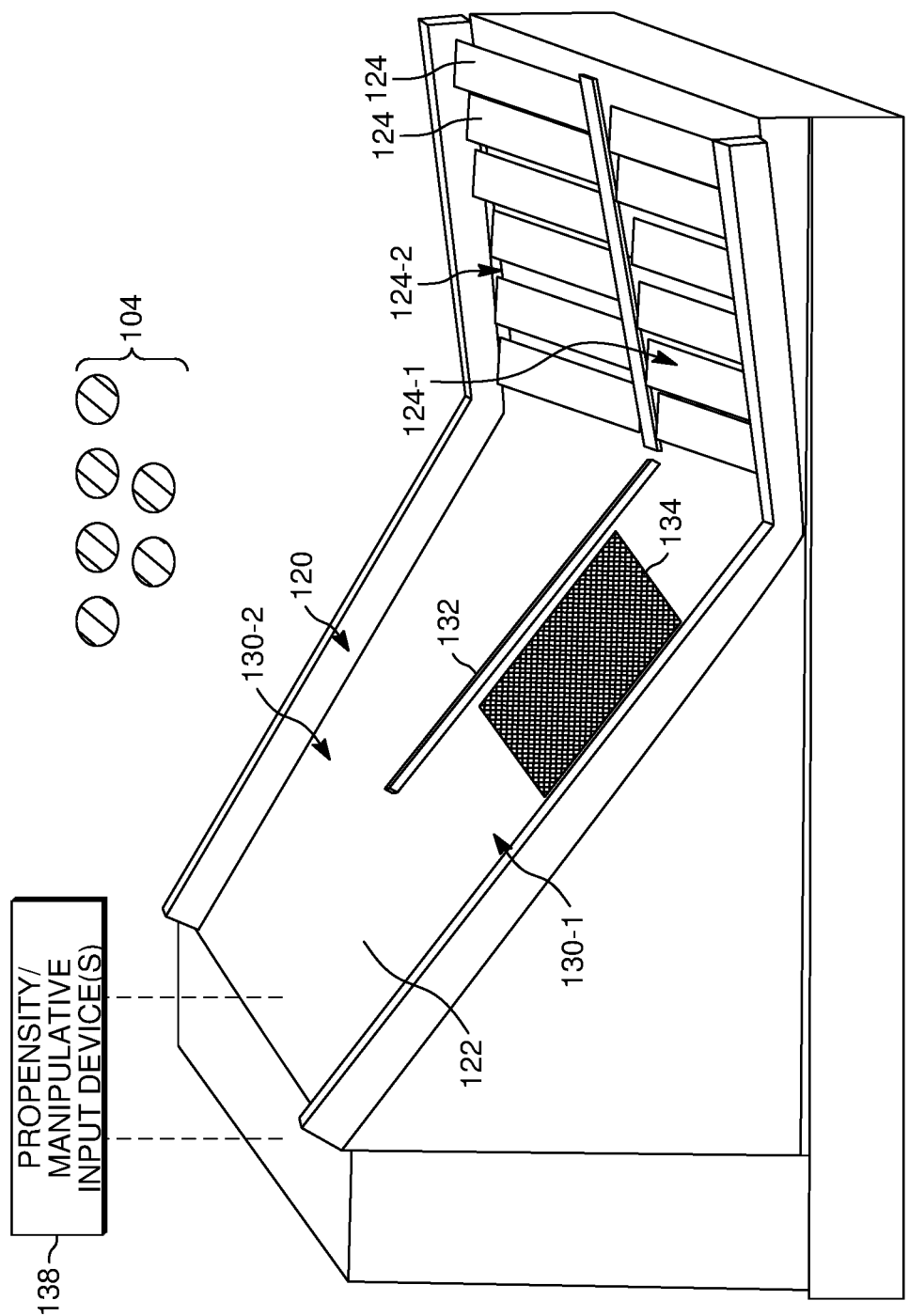
FIG. 2A illustrates an embodiment of an instructional tool utilizing a ramp structure for implementing different treatment and propensity inputs.

FIG. 2A schematically illustrates an embodiment of the instructional tool 100 utilizing a ramp structure 120 to provide a simulation input to subject element balls 104. The ramp structure 120 includes an inclined ramp surface 122 which applies an input momentum or acceleration at the top of the ramp structure 120 to roll balls 104 down the ramp surface 122. A bottom of the ramp structure 120 is sloped to slow the momentum of the subject elements or balls 104 to provide an output measurement or distance. As shown, the scoring tiles 124 or blocks are provided at the bottom of the ramp structure 120 to provide the outcome measure or travel distances of the balls 104. In the illustrated embodiment, the bottom of the ramp structure 120 is sloped to slow the subject element balls, however, application is not limited to the particular structure or arrangement shown. Balls 104 having different characteristics or weights will have different output distance measurements. In the embodiment shown, the scoring tiles 124 are spaced or graduated to provide a desired output score distribution. In an illustrated embodiment, the smaller the travel distance, the higher the score measurement, although application is not limited to a particular score methodology. In one embodiment (not shown) the scoring tiles 124 are sloped towards an outer edge of the ramp to limit interference between the scored balls and the balls rolling down the ramp surface 122.

In the embodiment shown in FIG. 2A the ramp structure 120 includes a treatment path 130-1 and a non-treatment path 130-2 separated by divider 132 extending along the treatment and non-treatment paths 130-1, 130-2. The treatment path 130-1 includes a treatment device or mechanism 134 along the ramp surface 122 above or preceding the scoring tiles 124. The divider 132 as shown extends along the scoring tiles 124 to separate the subject elements for measurement along a treatment side scoring tiles 124-1 and non-treatment side scoring tiles 124-2. The balls or subject elements 104 are assigned to one of the multiple treatment paths 130-1, 130-2 based upon a propensity input or mechanism 138 (illustrated schematically). The treatment device or mechanism 134 increases or decreases the momentum and output distance or score of the subject element balls 104. In the illustrated embodiment the treatment device is a pad having an increased surface friction relative to the sloped ramp surface 122 to slow or retard velocity of the subject balls 104 to reduce the output distance of subject elements compared to the non-treatment path 130-2 having no increased surface friction relative to the ramp surface 122.

Thus, the treatment path 130-1 provides a higher surface friction than the no-treatment path 130-2 to provide a negative input that reduces the outcome distance.

Illustratively, the treatment and non-treatment paths 130-1, 130-2 simulate a statistical study of the effect of treatment, such as a drug treatment vs a placebo treatment on a subject population through illustration of the outcome measurements or distribution of the treated and non-treated subject elements 104 of the tool. The subject elements 104 of the tool can include a set of subject elements having the same weight, size and surface friction characteristics to provide a similar output score prior to treatment or the set of subject elements 104 can have different weight, size and surface friction characteristics for various simulations as will be described.

Figure 2B:
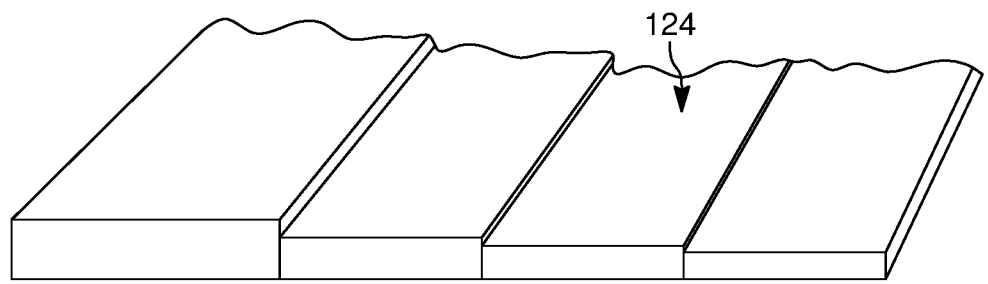
FIG. 2B is a detailed view of an embodiment of score tiles at a bottom of the ramp structure of FIG. 2A.
Figure 2C:
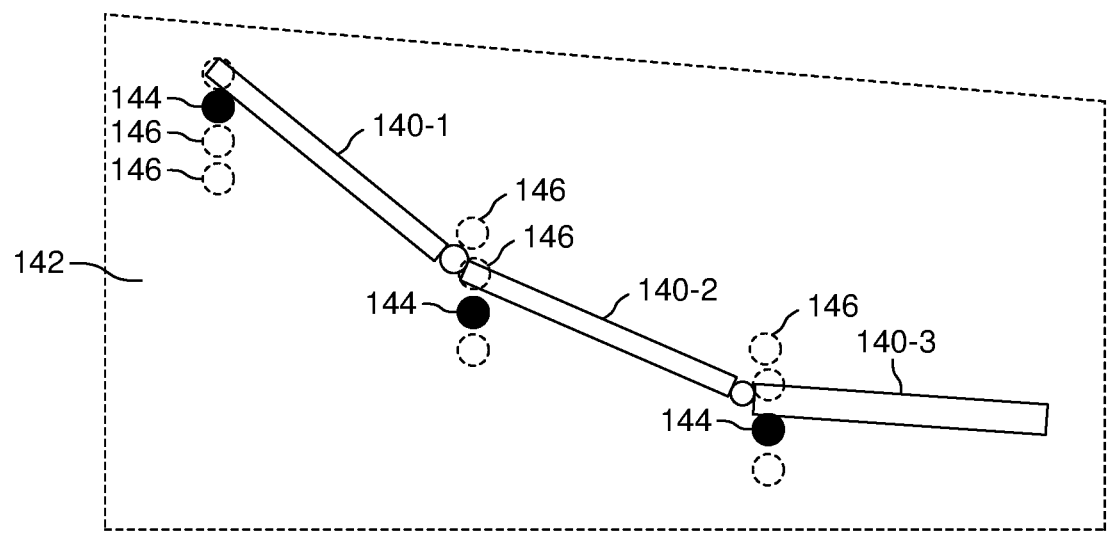
FIG. 2C illustrates one embodiment of a ramp surface including adjustable ramp sections or platforms for adjusting slope or inclination of the ramp surface and sections.

FIG. 2B is a detailed view of one embodiment of the scoring tiles 124 for providing an output measure or distribution for the subject element 104. As shown, the scoring tiles 124 are evenly spaced and stepped to provide a distinctive score distribution. It should be understood that application is not limited to the specific scoring tiles shown having a uniform spacing, and in alternate embodiments the spacing or distribution of tiles can be non-uniform, such as a non-uniform pattern 1.2..3...4....5.....6......7.......8........9.........10 to provide a useful output distribution. In an illustrated embodiment shown in FIG. 2C, the ramp structure 120 include multiple platform sections 140-1, 140-2, 140-3 supported by a frame structure 142 (illustrated in phantom).

The platform sections 140-1, 140-2, 140-3 are hingedly connected to separately adjust the inclination angle of each of the platform sections 140-1, 140-2, 140-3. In the embodiment shown, the ramp structure 120 includes three platform sections including a top section 140-1, a treatment section 140-2 and a bottom scoring section 140-3. The treatment and non-treatment paths 130-1, 130-2 are along the treatment section 140-2 and the scoring tiles 124 are along the bottom section 140-3. As schematically shown in the illustrated embodiment the inclination is adjusted by adjusting a height or elevation of dowels 144 supporting each of the platform sections 140-1 through 140-3. As shown, the frame 142 of the ramp structure 120 includes a plurality of dowel slots 146 (illustrated in phantom) at different height elevations. The inclination angles of the platform sections 140-1, 140-2, 140-3 are adjusted by raising or lowering the dowels 144 by inserting the dowels in different slots 146 at different height elevations.

Figure 2D:
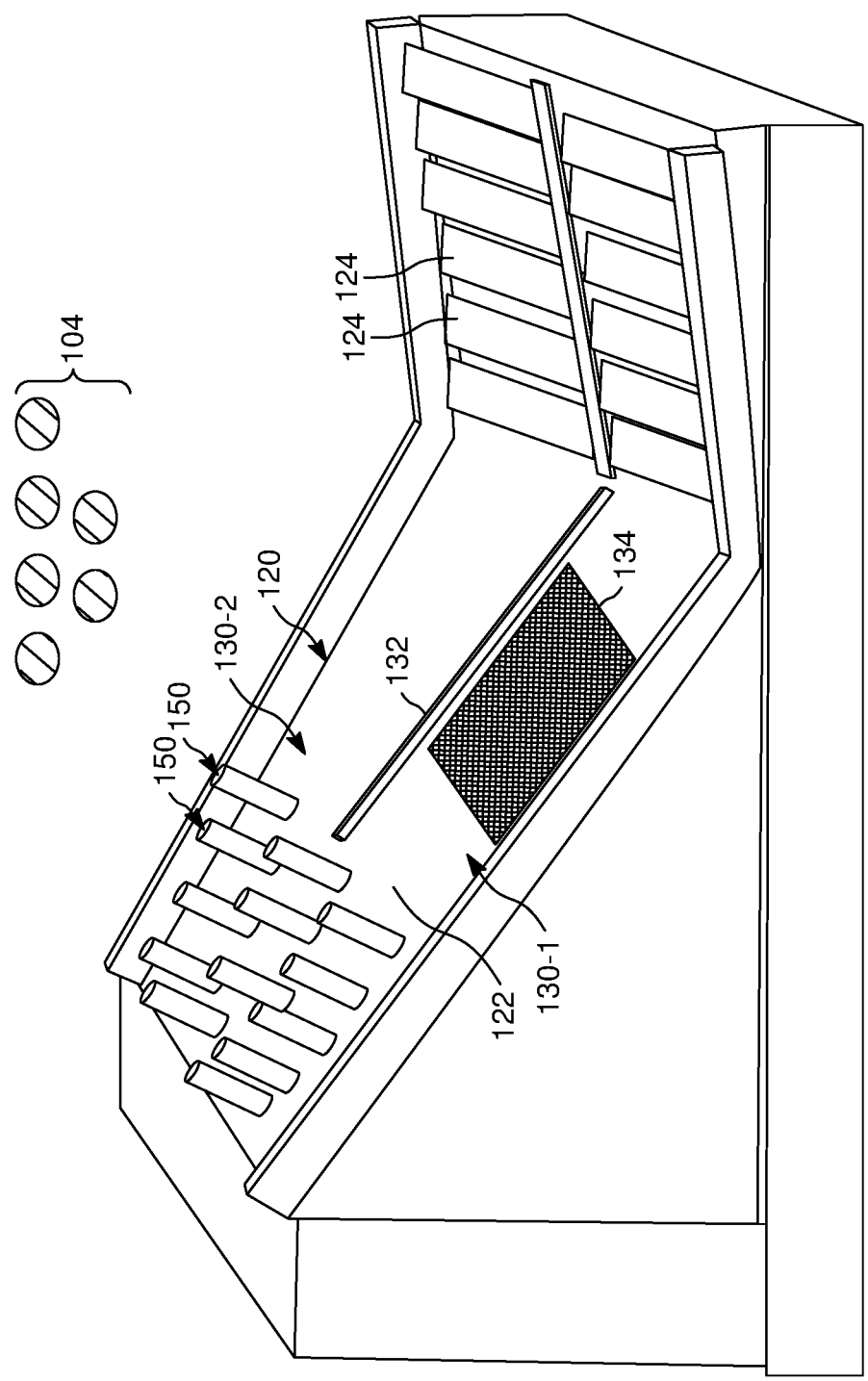
FIG. 2D illustrates an embodiment of the ramp structure shown in FIG. 2A having a random propensity input mechanism.

As previously described in FIG. 1, the tool uses a propensity input to assign the subject elements to follow the treatment path 130-1 or the non-treatment path 130-2. FIG. 2D illustrates an embodiment of a random propensity input mechanism to randomly assign subject elements 104 to the treatment path 130-1 and the non-treatment path 130-2. As shown, the random propensity input device includes a pattern of pegs 150. In an illustrative embodiment, the pegs 150 are supported between opposed boards (not shown) to provide structural rigidity for the pegs 150. The random propensity input mechanism is supported at the top of the ramp structure 120 above the treatment path 130-1 and non-treatment path 130-2 to randomly assign balls to the treatment path and the non-treatment path 130-2. As the balls 104 roll along the ramp surface 122, the balls 104 contact the pegs 150. The pegs 150 are patterned to randomly direct the balls 104 to either the treatment path 130-1 or the non-treatment or control path 130-2 to provide an ignorable treatment assignment. Thus, some of the subject elements or balls 104 are randomly directed to the treatment path 130-1 and some to the non-treatment or control path 130-2. It should be understood, that application is not limited to cylindrical pegs 150 as shown, and other shapes or configurations can be used to randomly direct the subject elements or balls 104. For example, in an illustrative embodiment, the pegs 150 are semicircular shaped. The random propensity input mechanism provides simulation for same or different subject elements for random or ignorable treatment assignment.

Figure 2E:
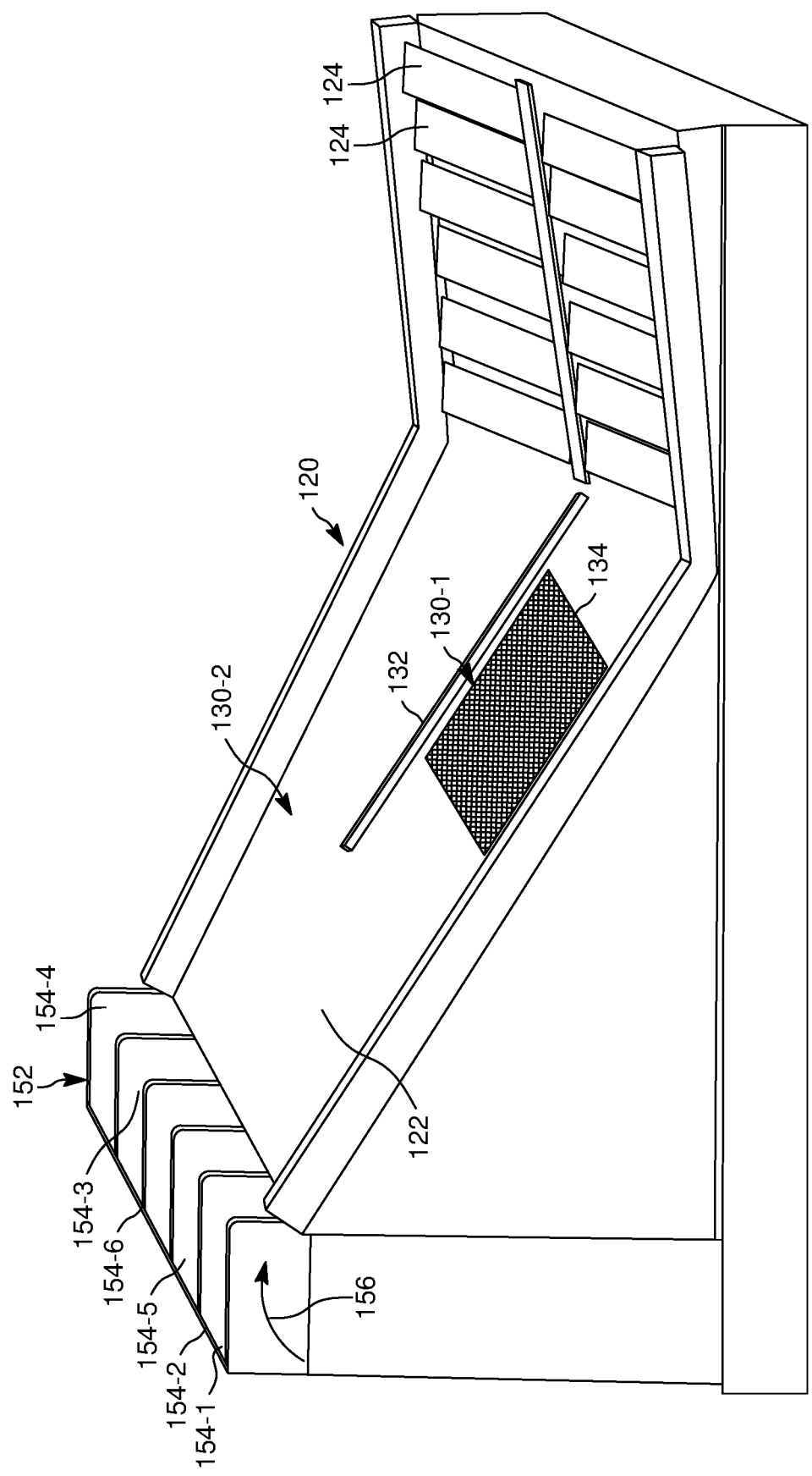
FIG. 2E illustrates an embodiment of the ramp structure shown in FIG. 2A utilizing a hopper structure to provide an assignable propensity input mechanism for subject elements.

FIG. 2E illustrates a hopper 152 that provides a selectable propensity input for subject elements or balls 104 to follow either the treatment path 130-1 over the non-treatment path 130-2 or the non-treatment path 130-2 over the treatment path 130-1. As shown, the hopper 152 includes a plurality of hopper bins 154-1 through 154-6 spaced between opposed sides of the ramp structure 120. The balls in bins 154-1, 154-2 have a higher propensity to follow the treatment path 130-1 while the balls in bins 154-3 and 154-4 have a higher propensity to follow the non-treatment path 130-2. The bins 154-5-154-6 between bins 154-1 154-2, 154-3, 154-4 have a lower propensity to follow either of the treatment or non-treatment paths 130-1, 130-2. Thus, the user can assign a propensity input to select subject elements via placement of the subject elements 104 in the bins 154-1 through 154-6 to simulate the effect of treatment assignment on outcome measures or distribution. The hopper 152 is hingedly connected to the ramp structure 120 and when full is rotated as illustrated by arrow 156 to dispense the subject elements or balls down the inclined ramp surface 122. The hopper 152 can be used in combination with a peg board with pegs 150 (not shown) to slow the balls and direct the balls to the treatment and non-treatment paths 130-1, 130-2 based upon the input propensity via hopper 152.

FIG. 2F illustrates a ramp structure 120 utilizing a laterally sloped manipulative device 160 to provide a biased propensity and confounding input to the subject elements 104. As shown, the device 160 is laterally sloped toward the treatment path 130-1 to provide a bias propensity toward the treatment path 130-1 as illustrated by arrow 162. In particular, the sloped manipulative device 160 provides a higher propensity for the heavier or lower friction subject elements 104 to follow the treatment path 130-1 compared to the lower weight subject elements. The incline slope of the manipulative device 160 imparts momentum or confounding input to the balls 104 which increases momentum of the subject elements or balls 104 as will be described. In the embodiment shown, the device has a raised edge 164 that provides the sloped surface towards the treatment path 130-1. A leading edge 166 of device 160 is flush with the ramp surface and a trailing edge 168 includes the raised edge 164 to form the inclined slope toward a lower edge 169 or the treatment path 130-1 to increase the propensity for the subject elements (particularly heavier subject elements) to follow the treatment path 130-1. The sloped incline imparts momentum to the subject elements 104 for simulating a non-ignorable treatment assignment.

Figure 3A:
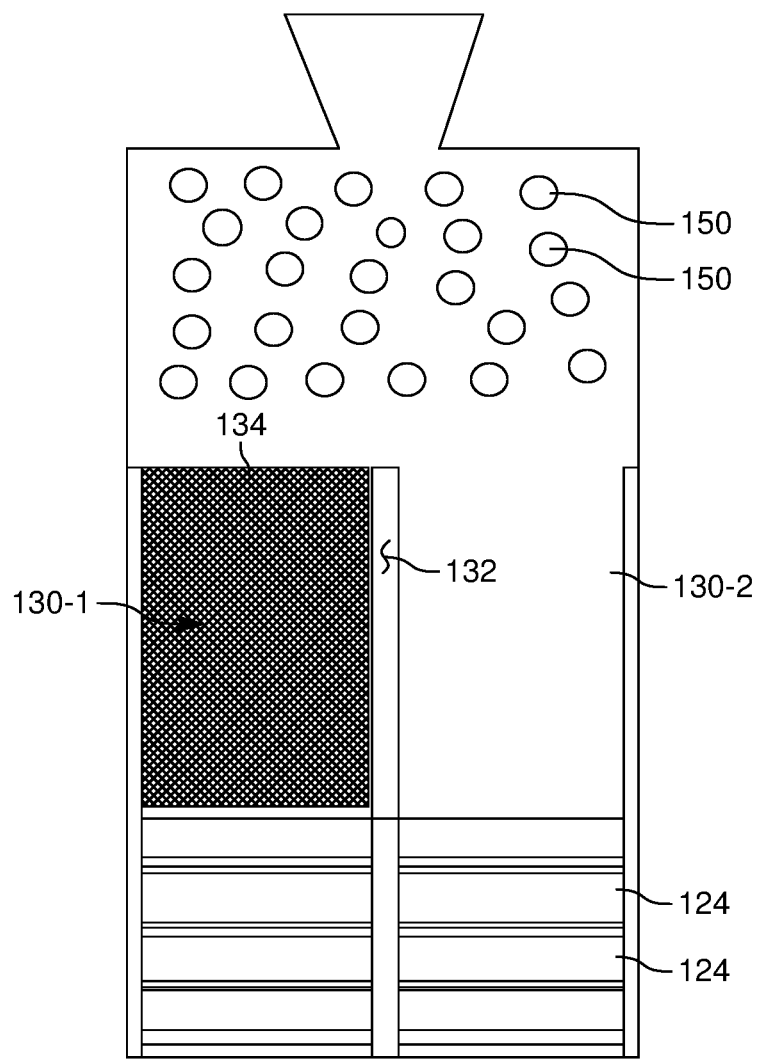
FIG. 3A is a schematic illustration of one embodiment of a simulation model using a random propensity input to randomly assign subject elements to a treatment path and a non-treatment path of a ramp structure.
Figure 3B:
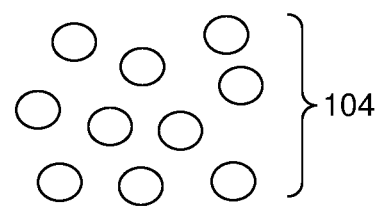
FIGS. 3B-3C illustrate output measures or distribution for different subject elements having a random assignment and treatment input simulated via the ramp structure illustrated in FIG. 3A.
Figure 3B:
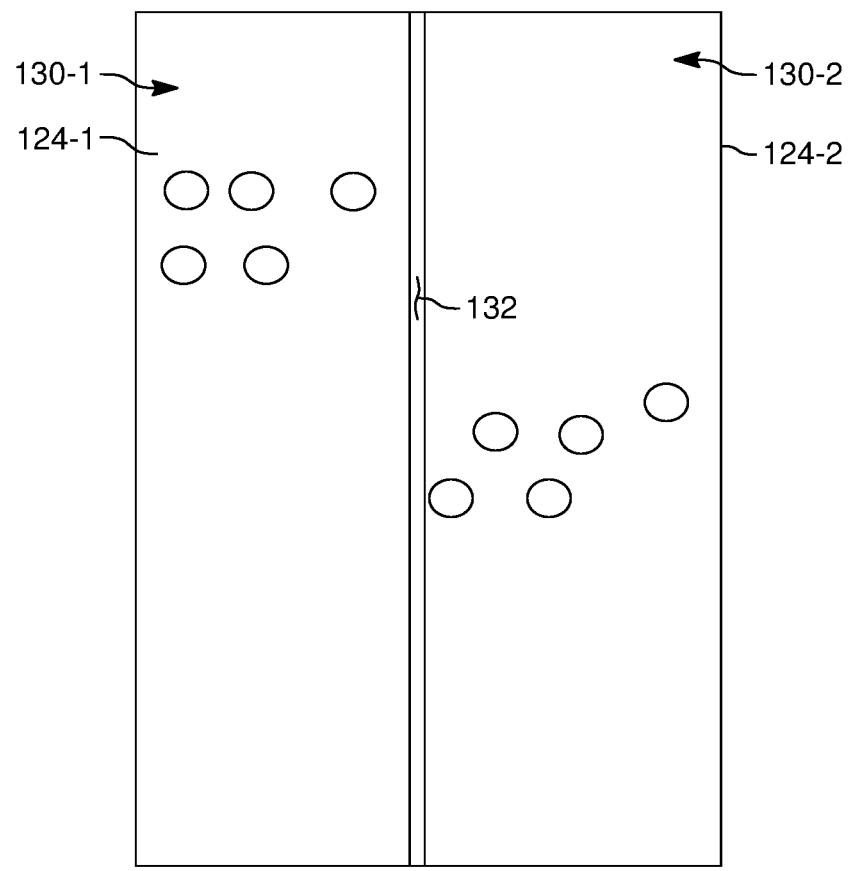
Figure 3C:
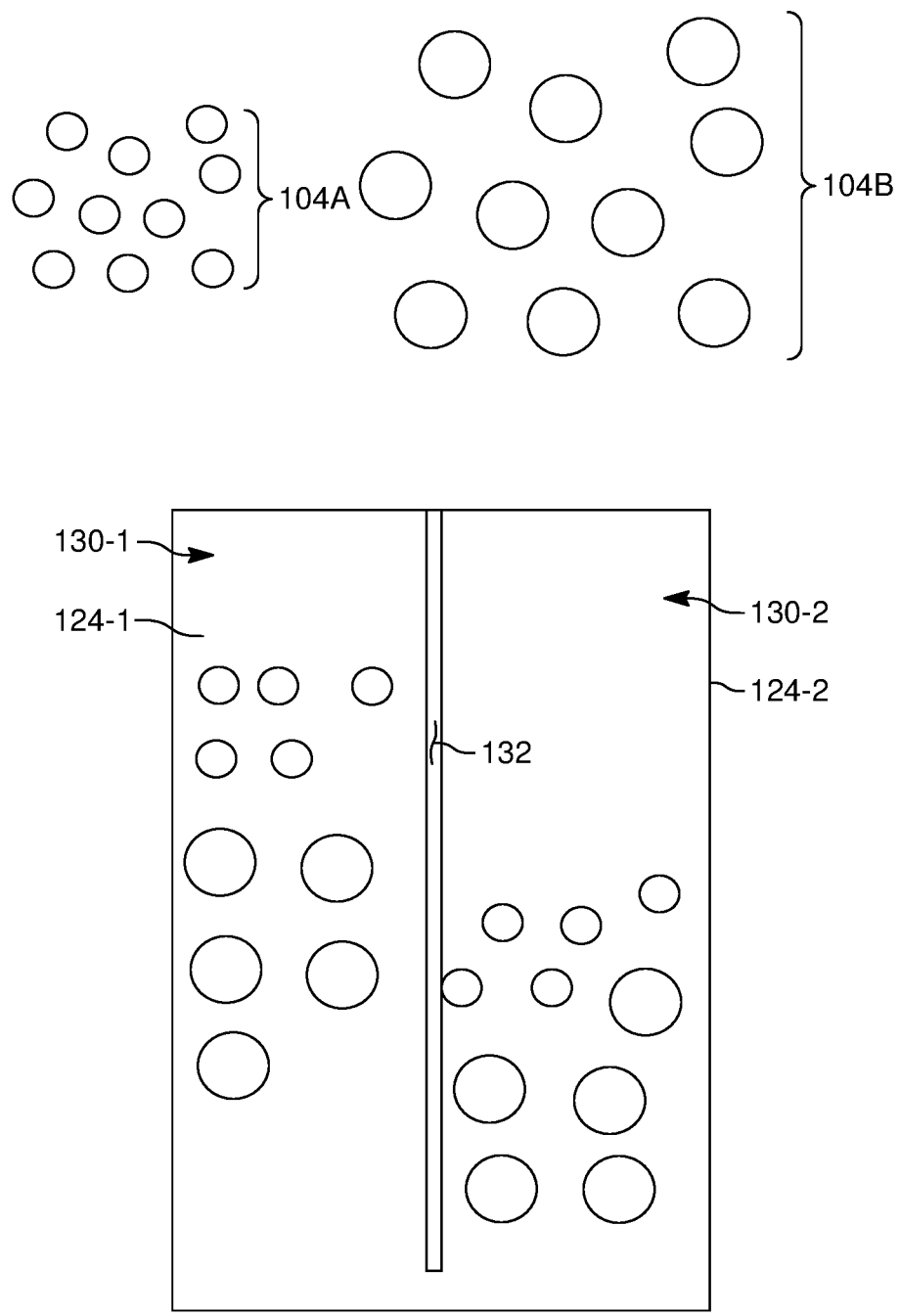

FIGS. 3A-3C schematically illustrate various embodiments of different simulations for a random propensity input or assignment for subject elements 104 to follow the treatment path 130-1 and the non-treatment path 130-2. As shown, schematically shown in FIG. 3A, the treatment path 130-1 has a higher friction or textured surface to retard momentum of the balls 104 along the treatment path 130-1. Illustratively, a felt pad is provided along the treatment path 130-1 to increase the surface friction along the treatment path 130-1 to reduce momentum of the balls 104. As shown in FIGS. 3B-3C, the subject elements that follow the treatment path 130-1 have lower output distances or measure than the subject elements that follow the non-treatment path 130-2. In the simulation shown in FIG. 3B, the subject elements 104 are the same while in FIG. 3C, the subject elements 104A, 104B have different weight, size and friction characteristics.

FIG. 3B illustrates one embodiment of an output from a simulation for a set of uniform balls 104 or subject elements using the random propensity input to assign the subject elements to the treatment and non-treatment paths 130-1, 130-2. In the illustrated embodiment, the balls 104 have the same acceleration and velocity parameters along the ramp surface except along the treatment path 130-1. As shown, the balls 104 that follow the treatment path 130-1 have a smaller travel distance or measure than the balls 104A that followed the non-treatment path 130-2. Thus, it can be concluded that the treatment input (i.e. increased friction) of the treatment path 130-1 is effective in altering the output measure as compared to the non-treatment path 130-2.

FIG. 3C illustrates one embodiment of the same simulation using a random propensity input and treatment paths 130-1, 130-2 shown in FIG. 3A-3B for balls in the subgroups 104A, 104B having different characteristics, such as weight, density or surface friction, that affect momentum or movement of the balls 104A, 104B along the ramped surface 122. As illustrated in FIG. 3C, overall, the subject elements or balls 104A-104B that followed the treatment path 130-1 have a shorter output distance than the balls 104A-104B that followed the non-treatment path 130-2 suggesting that treatment is effective to reduce the output distance of the balls 104A, 104B. However, as can be observed, some of the balls 104A, 104B that followed the treatment path 130-1 have a longer output distance or measure than balls 104A, 104B that followed the non-treatment path 130-2 due to variations in the characteristics, or weight of the subject elements or balls 104A, 104B.

Figure 3D:
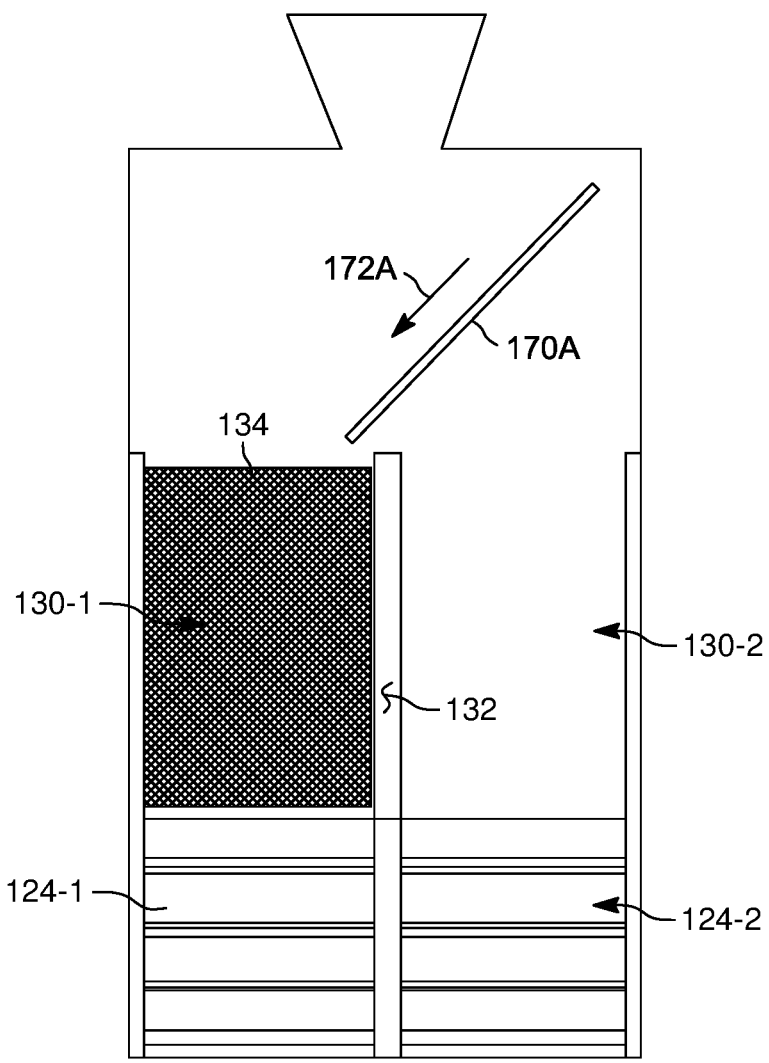
FIG. 3D illustrates a ramp structure having a one-way propensity input to a treatment path.
Figure 3E:
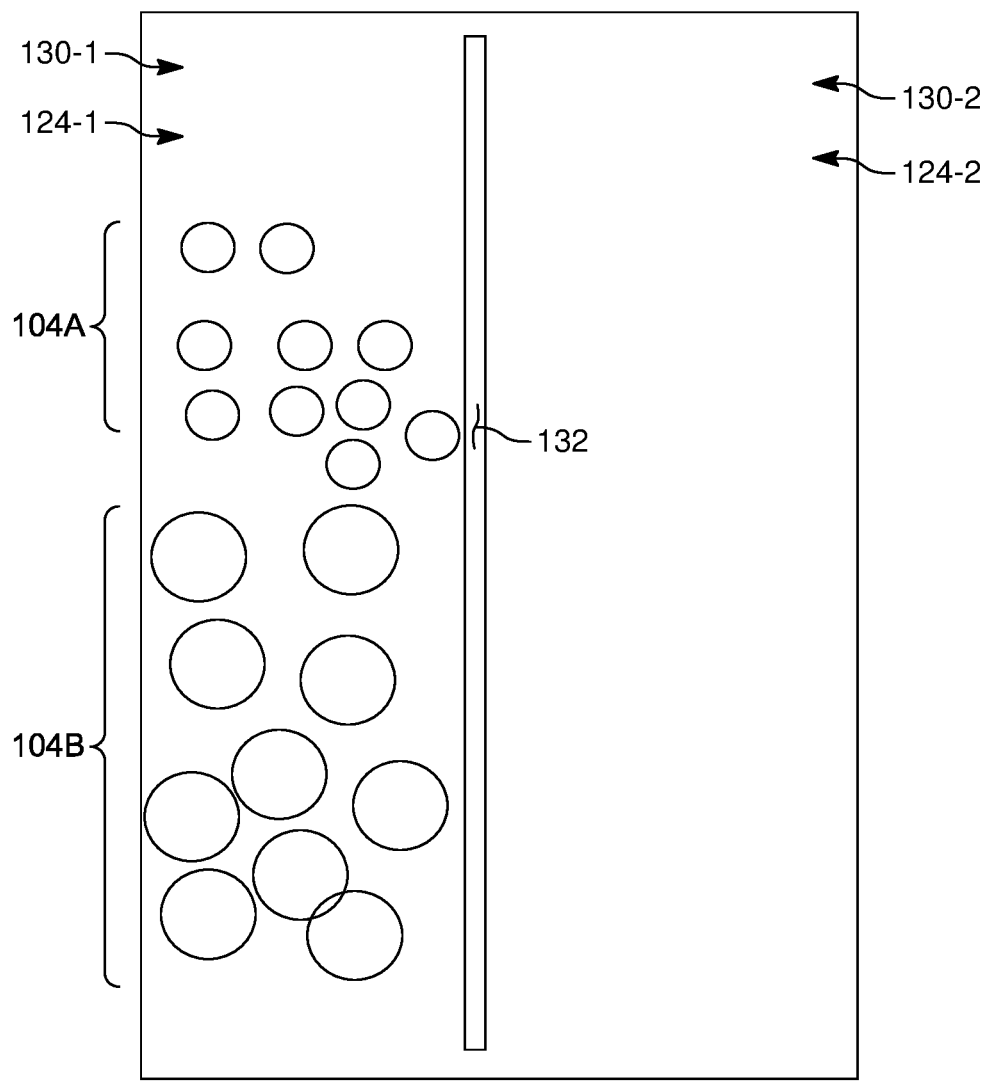
FIG. 3E illustrates an output measure or distribution for different subject elements directed to the treatment path via the one-way propensity input illustrated in FIG. 3D.
Figure 3F:
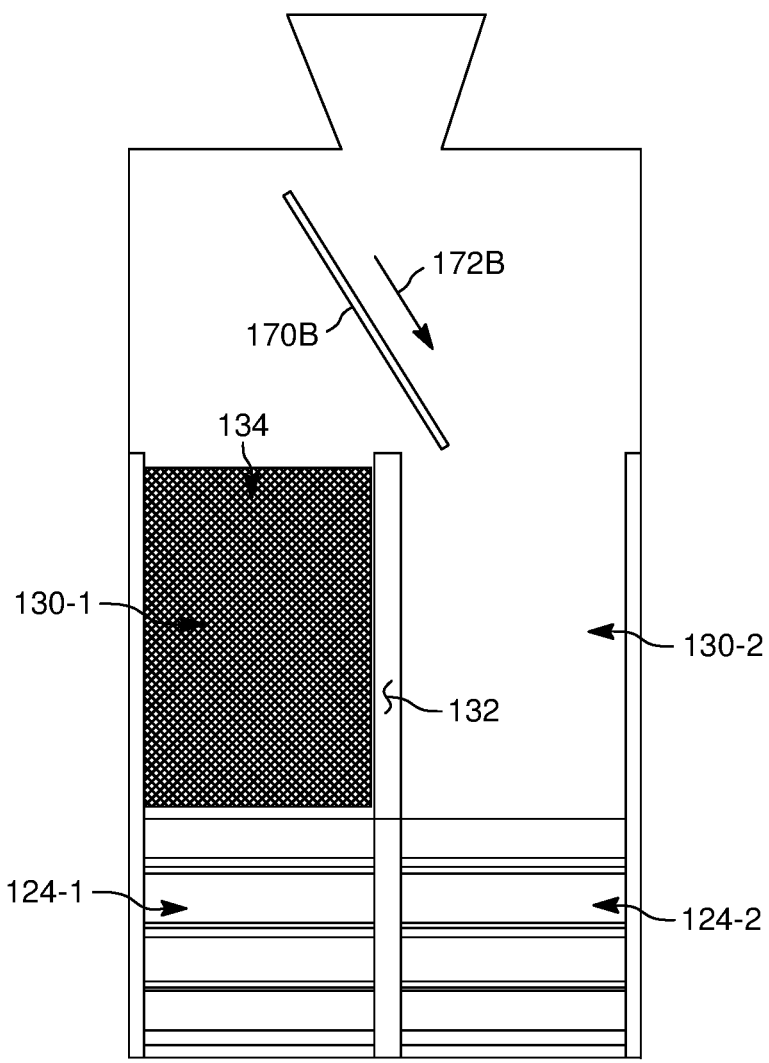
FIG. 3F illustrates a ramp structure having a one-way propensity input to a non-treatment path.

FIGS. 3D-3G illustrate certain embodiments of different one-way propensity inputs. FIG. 3D illustrates one embodiment of a one-way input to the treatment path 130-1 and FIG. 3F illustrates one embodiment of a one-way assignment input to the non-treatment path 130-2. As shown in FIG. 3D, an angled barrier structure 170A provides the one-way assignment input to the treatment path 130-1 as shown by arrow 172A to direct the balls toward the treatment path 130-1 to provide a controlled assignment input to the treatment path 130-1. In a simulation using the one-way assignment input toward the treatment path 130-1, there is an observed outcome score variation due to the variety of balls 104A, 104B as shown in FIG. 3E. The same observation is true for a simulation outcome shown in FIG. 3G for the one-way non-treatment assignment input to the non-treatment path 130-2 via the barrier structure 170B as shown in FIG. 3F. As shown, the angled barrier structure 170B direct the balls 104A, 104B to the non-treatment path 130-2 as illustrated by arrow 172B in FIG. 3F.

Figure 3G:
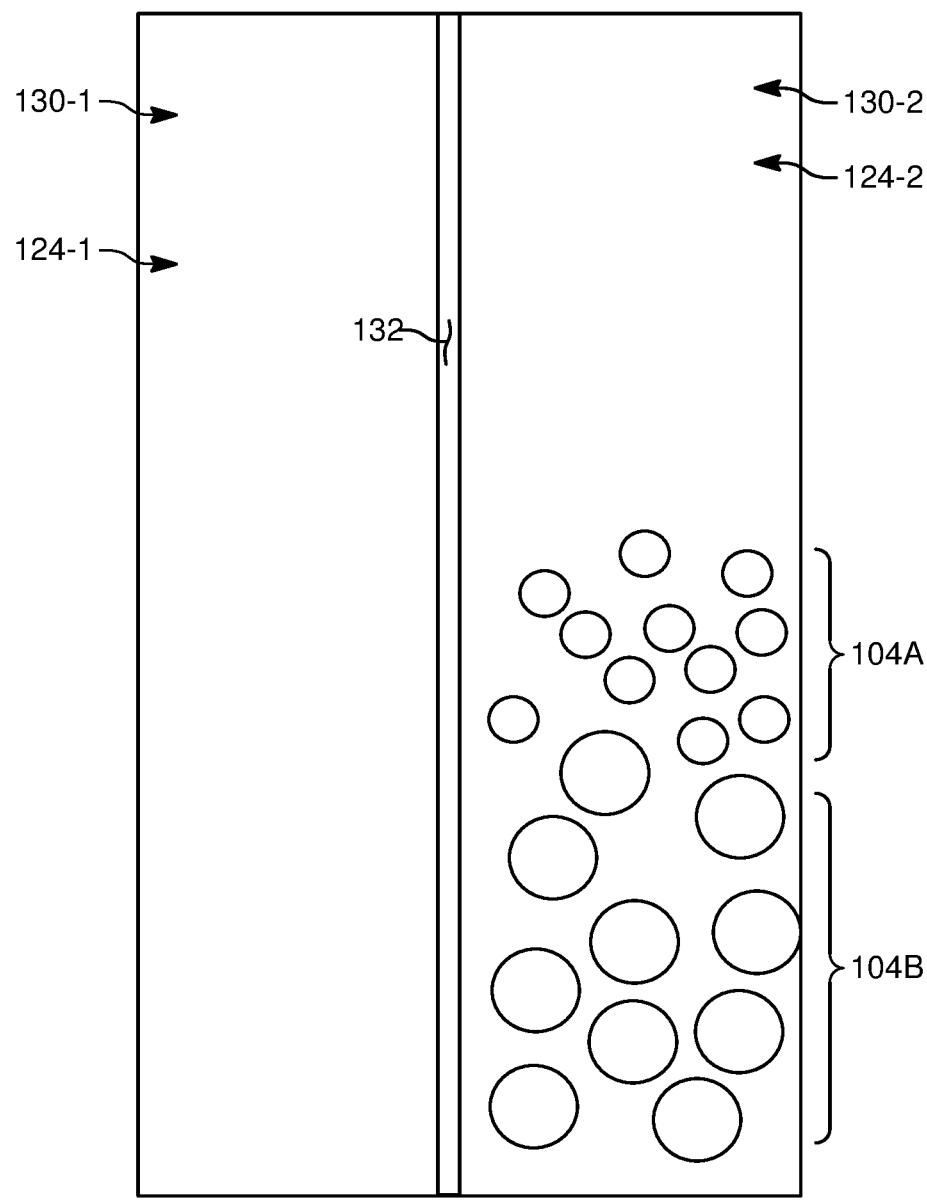
FIG. 3G illustrates an output measure or distribution for different subject elements directed to the non-treatment path via the one-way propensity input illustrated in FIG. 3F.

As comparatively shown in the illustrated output results for FIGS. 3E and 3G, the mean outcome distances of the non-treatment path 130-2 is lower or smaller than the treatment path 130-1 illustrating the effect of treatment to decrease the output distance. Often in statistical studies, the same subject elements or population cannot be assigned to the treatment path and the non-treatment path simultaneously. However, the tool of the present application allows for simulation of treatment and non-treatment of the same subject elements using the one-way assignment inputs to the treatment path 130-1 and the non-treatment path 130-2 as shown.

Figure 3H:
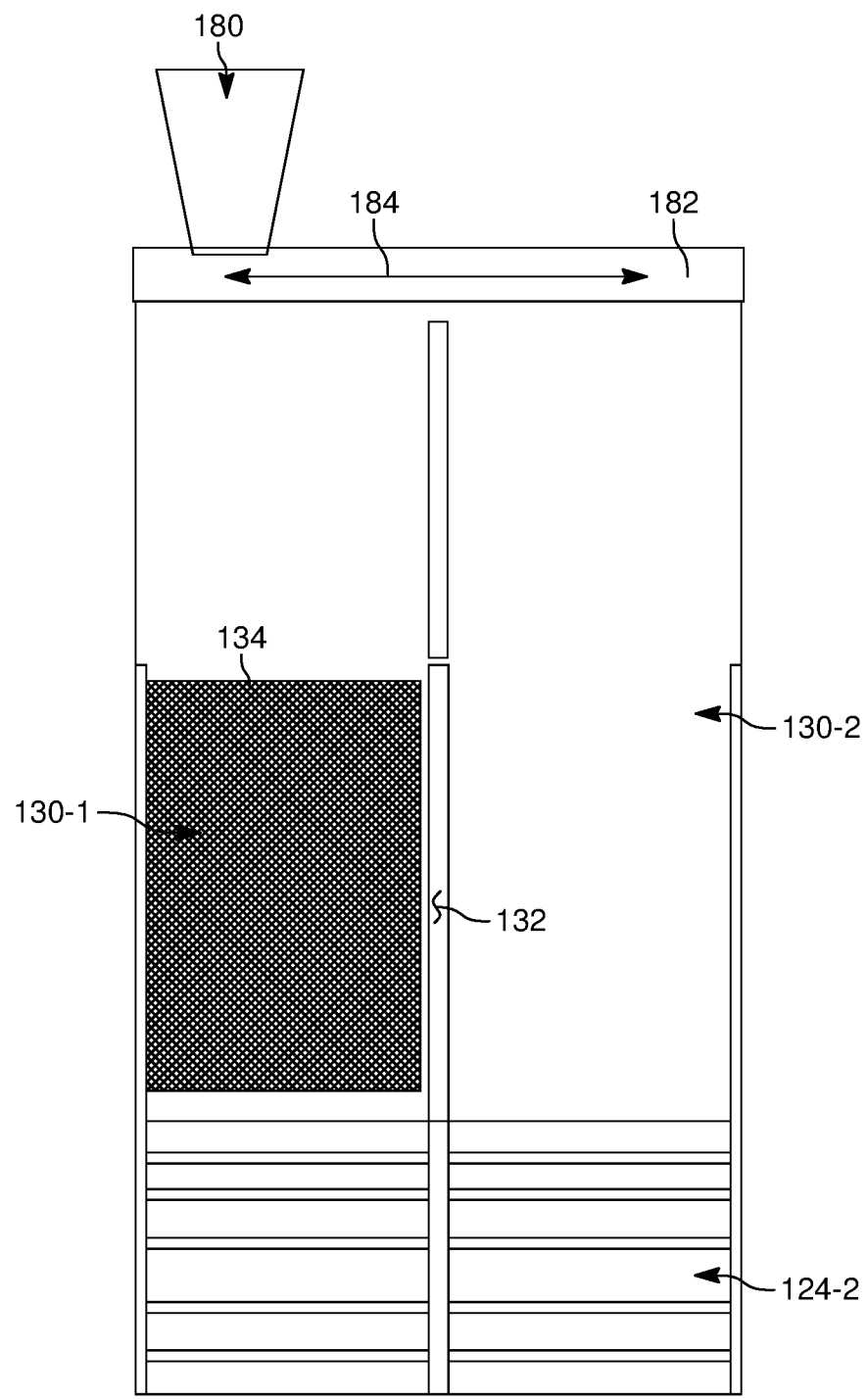
FIG. 3H illustrates implementation of a one-way propensity input via an adjustable hopper.
Figure 3I:
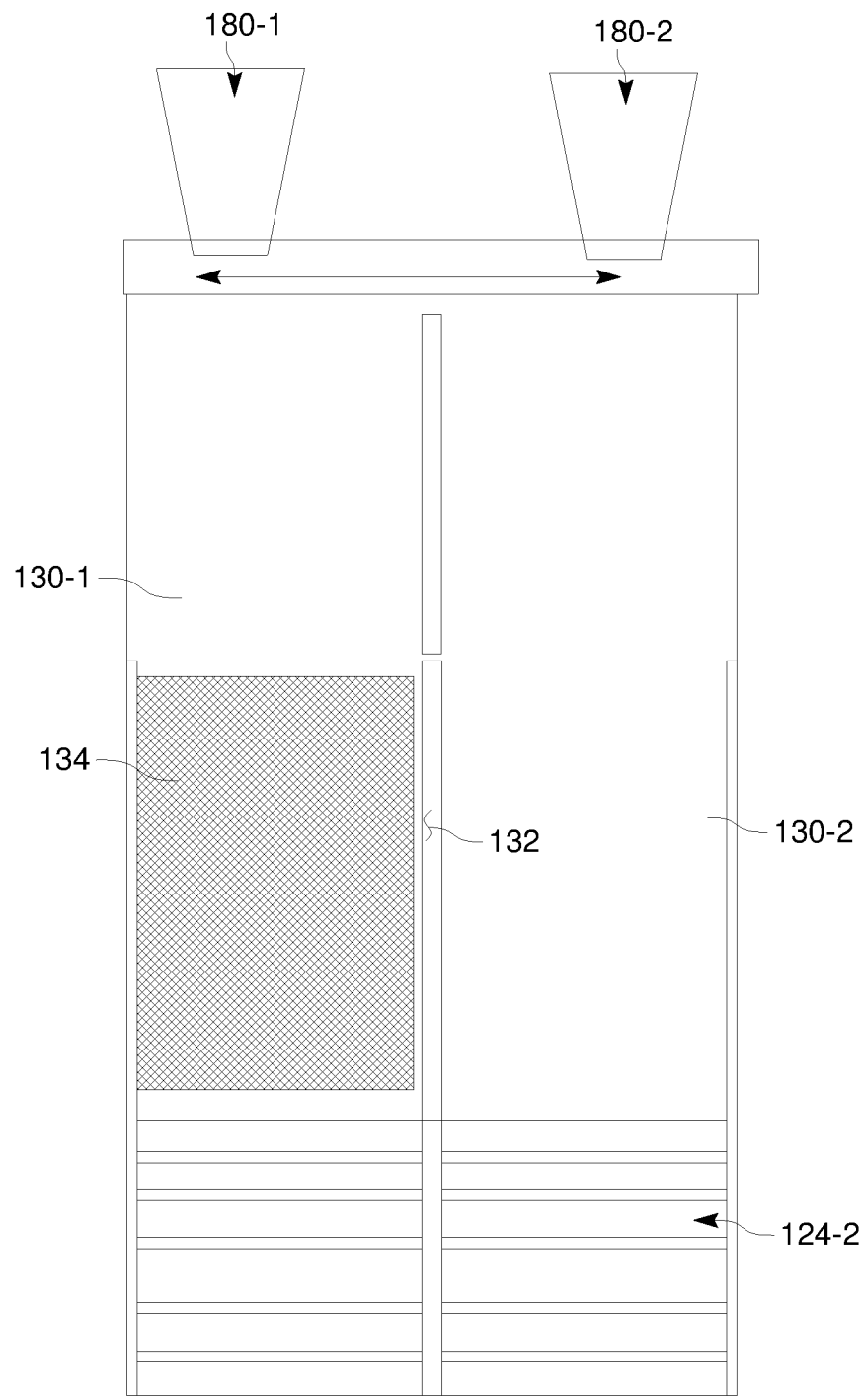
FIG. 3I illustrates multiple hoppers to provide a propensity input mechanism for subject elements depending upon user preference.

FIGS. 3H-3I illustrate various embodiments of a one-way propensity input mechanism. As shown, the one-way propensity mechanism includes a hopper 180 movable along a track 182 (schematically shown). The position of the hopper 180 is moveable as illustrated by arrow 184 to selectively align the hopper 160 with the treatment path 130-1, and the non-treatment assignment path 130-2 to adjust the propensity for the subject element balls. In another embodiment, multiple hoppers 180-2, 180-3 selectively dispense balls 104 to the treatment assignment path 130-1 and the non-treatment assignment path 130-2. It should be noted that any number of hoppers 180 can be used to provide the propensity input to the balls or subject element 104 to following the treatment path 130-1 or the non-treatment path 130-2.

Figure 3J:
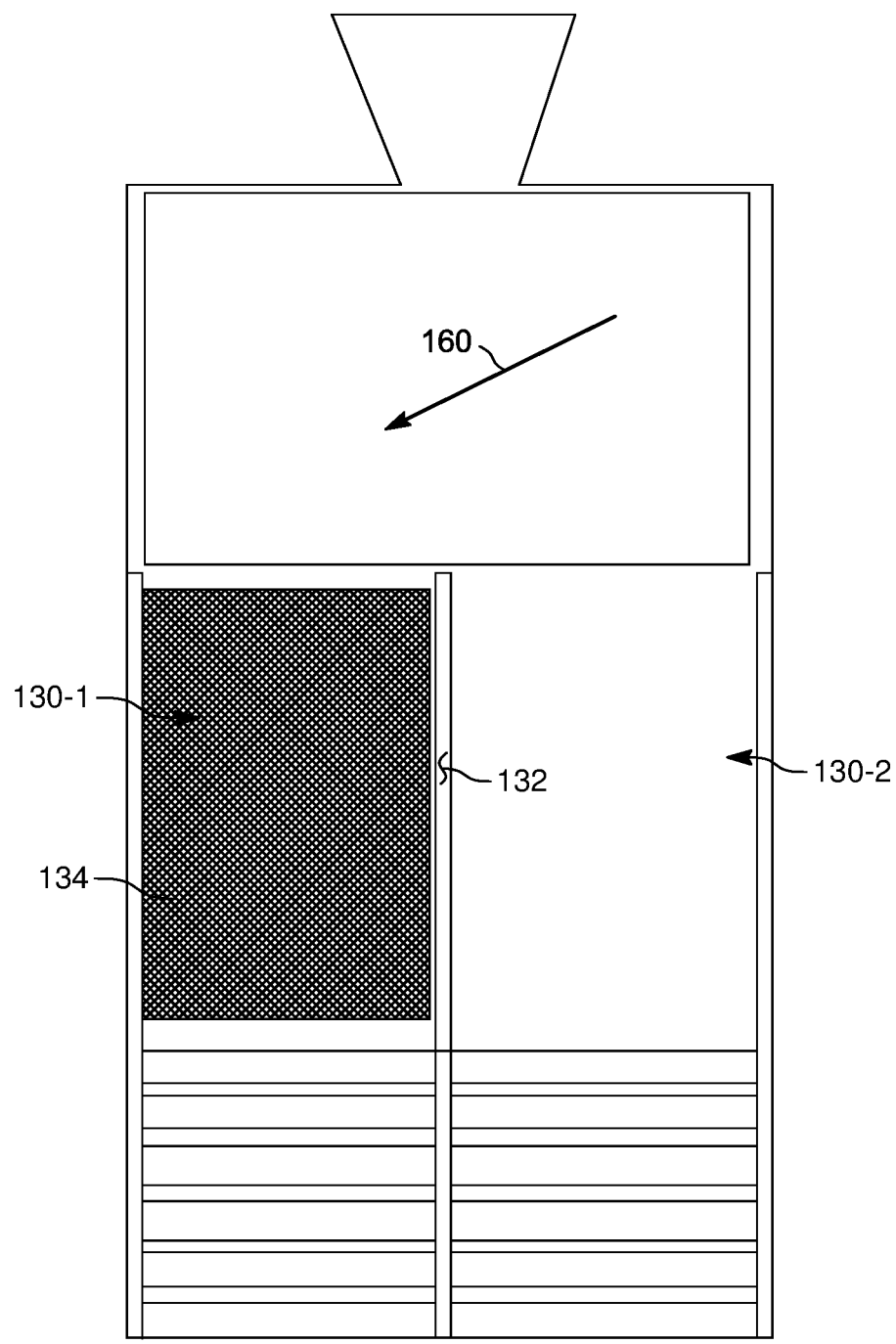
FIG. 3J illustrates a ramp structure having a biased propensity and confounding input mechanism as shown in FIG. 2F.
Figure 3K:
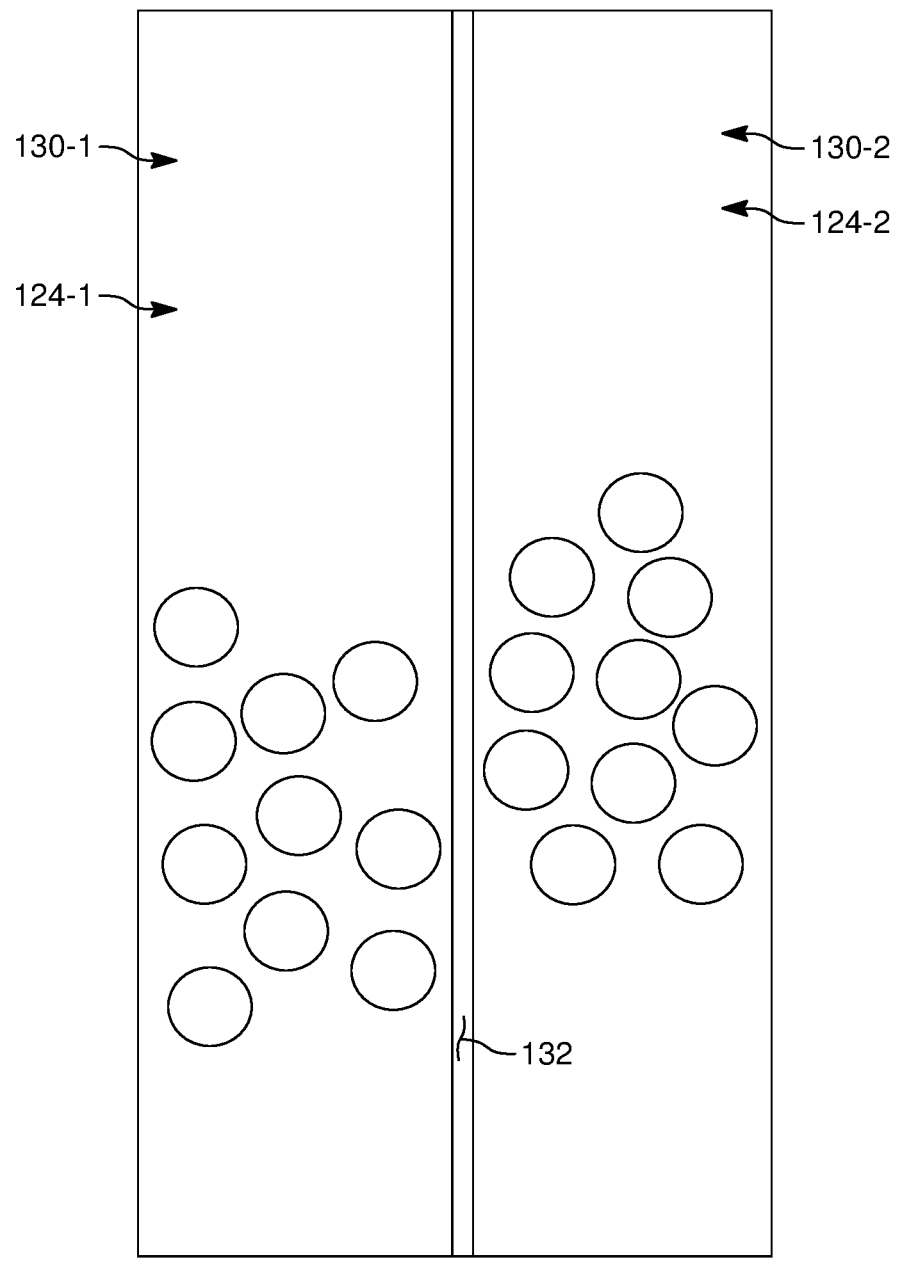
FIG. 3K illustrates an output measure or distribution for a simulation using the confounding input mechanism shown in FIG. 3J.

FIGS. 3J-3K illustrate an embodiment of the tool using the sloped manipulative device 160 which provides a non-ignorable input for the subject elements 104. As previously described, the manipulative device 160 is sloped towards the treatment path 130-1 to increase the propensity for the subject elements 104 to follow the treatment path 130-1 as compared to the non-treatment path 130-2 depending upon the characteristics of the subject elements and impart a confounding input to the subject elements to mask the applied treatment. FIG. 3K illustrates an output measure or distribution for a simulation using the manipulative device 160 which illustrates the effect of the confounding input with respect to the output relation between treatment and non-treatment subject elements. As shown, the results appear counter intuitive since the balls that followed the treatment path 130-1 have longer output distances than the balls that followed the non-treatment path 130-2 even though the treatment is designed to slow the balls. Thus, the outcome data seemingly indicates ineffective treatment, but this is only due to the confounding input, not due to the treatment itself, which is actually effective. In the embodiment shown, the confounding input provided by manipulative device 160 increases momentum while the treatment decreases momentum. In other embodiments (not shown), the treatment increases momentum and the confounding input decreases momentum. In other illustrations both the confounding input and treatment input increase or decrease momentum to simulate different confounding variables and inputs.

Figure 4:
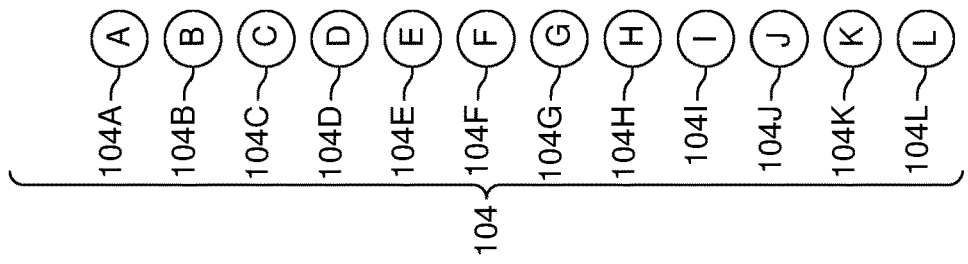
FIG. 4 illustrates a population of subject elements or balls for propensity matching.

In an illustrated embodiment, the tool 100 is used for teaching the principle of propensity matching to analyze the effect of treatment on a diverse population of subject elements. As shown in FIG. 4, the tool includes subject element 104A-104L that have different characteristics. In the particular embodiment shown, the elements 104A-104L have a different combination of weight, surface friction and size attributes. The different attributes include a heavy weight or light weight, high friction, low friction, large size and small size and each of the attributes affects how the treatment acts. Weight, friction and size attributes of the balls affects the propensity of each ball to follow the treatment path 130-1 or non-treatment path 130-2 as indicated by possible value of propensity for treatment score or measure 190 in FIG. 4. The propensity of subject elements 104A-104L to follow the treatment path 130-1 compared to the non-treatment path 130-2 is measured using the device illustrated in FIG. 3J with the sloped manipulative device 160. The propensity score for each ball or subject element is estimated via multiple trials. The propensity is measured by rolling each ball 104A-104L along the ramp and counting the number of times each ball follows the treatment path 130-1 relative to the non-treatment path 130-2. The heavier, lower friction subject elements or balls 104A-104L will have a greater propensity to follow the treatment path 130-1 than the lighter, higher friction subject elements or balls 104A-104L.

Knowing propensity scores for each ball 104A-104L allows for propensity score matching to be performed on the outcome results of a simulation that applies a confounding input via the sloped manipulative device 160. In an illustrated example, should subject element 104I happen to have been treated, it can be matched with ball or subject element 104L since both subject element 104I and 104L have a similar propensity score. Additional subject elements can be matched using the propensity score. For example, subject element 104D having a propensity score of 0.4 is matched to subject elements 104F, 104H having a similar propensity score. Should blocks 215 shown in FIG. 5C be placed so that conditional on these attributes, treatment assignment is strongly ignorable, then propensity score matching could be used in place of matching on the various attributes, should matching on various attributes not be feasible. The propensity score for each ball is estimated by subjecting each ball to multiple trials.

Figure 5A:
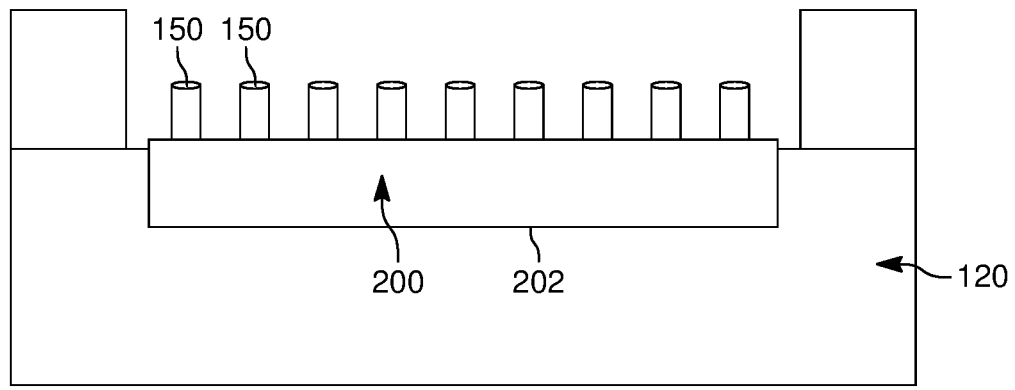
FIGS. 5A-5C illustrate different insets for adapting the ramp structure illustrated in FIG. 2A for different propensity or manipulative inputs.
Figure 5B:
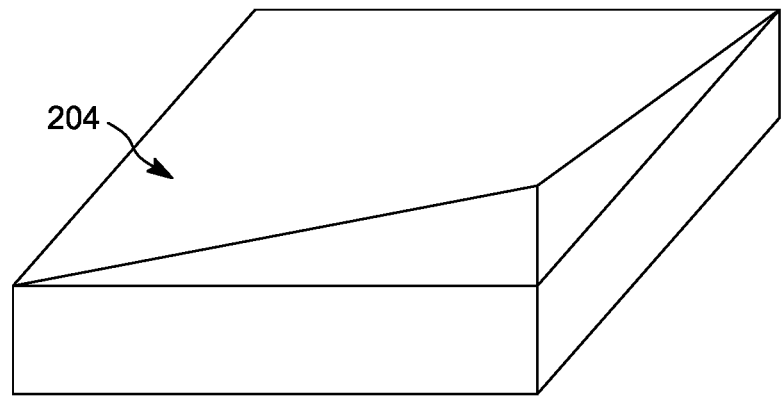
Figure 5C:
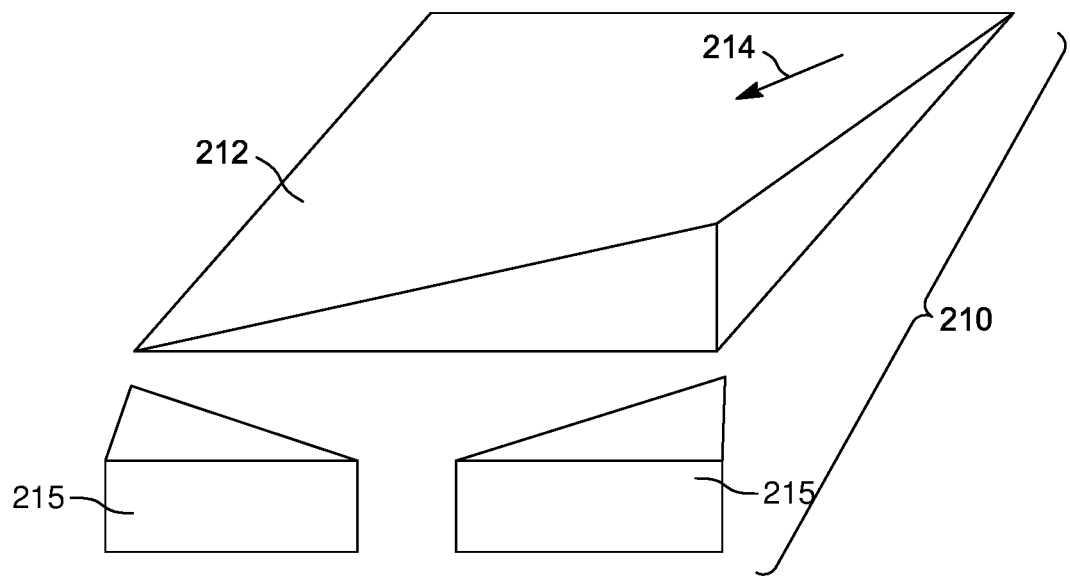

FIGS. 5A-5C illustrate embodiments of different insets for adapting the ramp structure 120 for different propensity inputs. The inset 200 shown in FIG. 5A includes the pattern of pegs 150 to provide the random propensity input shown in FIG. 2D to the subject elements. Inset 200 is removably inset into the ramp structure 120 via placement in an inset cavity 202 along the ramp surface 122 or on top of platform section 140-1. FIG. 5B illustrates an embodiments of a manipulative inset 204 for providing a propensity and confounding input to the subject elements. Different insets 204 can be used having different slopes to simulate different propensity values and inputs.

FIG. 5C illustrates an embodiment of an inset 210 providing an ignorable propensity and confounding input. As shown, the inset 210 includes a raised edge providing an inclined surface 212 sloped in the direction of the treatment path 130-1 as illustrated by arrow 214 and angled entry blocks 215 positioned below the inclined surface 212 to reduce the speed or momentum of the subject elements accelerated along the inclined sloped surface 212. Thus, the confounding input is masked by the blocks 215 which slows momentum of the subject elements prior to the treatment path 130-1 and non-treatment paths 130-2. Since the balls are slowed by blocks 215, the positive momentum input of the inclined surface 212 is eliminated to simulate the ignorable treatment assignment.

Figure 6A:
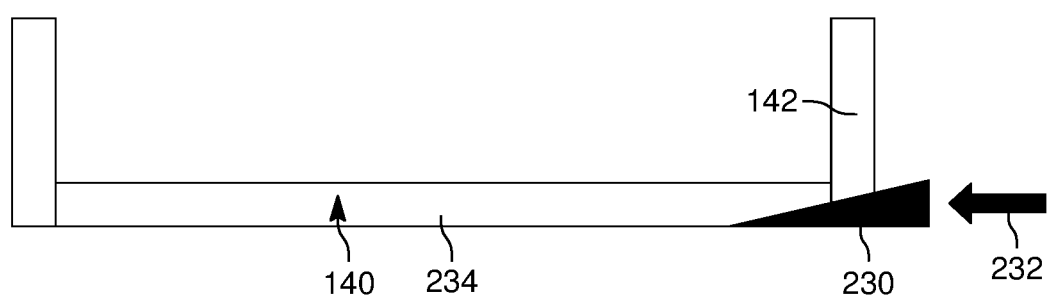
FIGS. 6A-6C illustrate embodiments of a ramp structure having adjustable inclines for providing a propensity/manipulative input mechanism for the ramp structure illustrated in FIG. 2A.
Figure 6B:
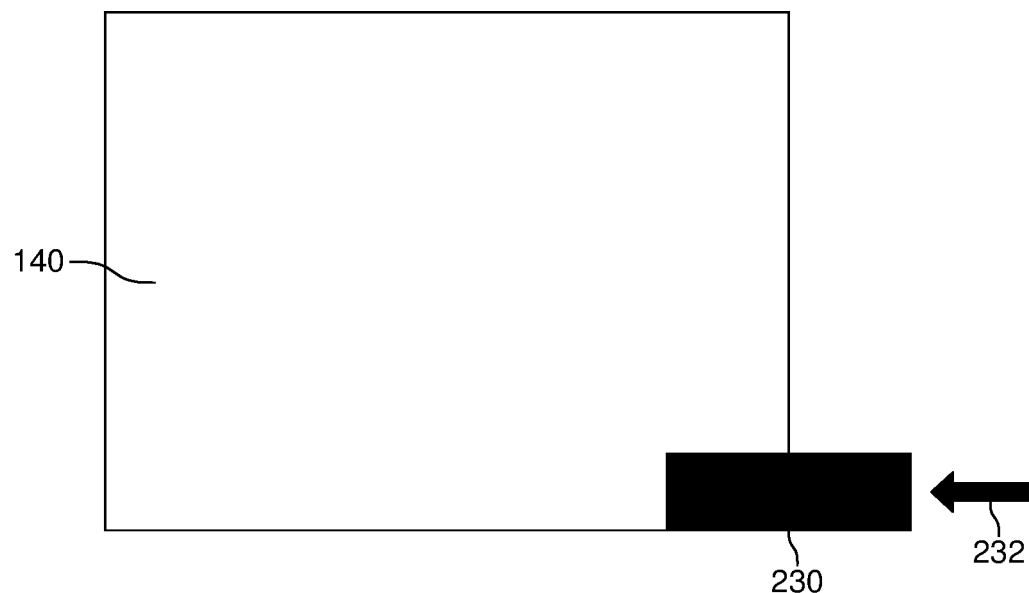
Figure 6C:
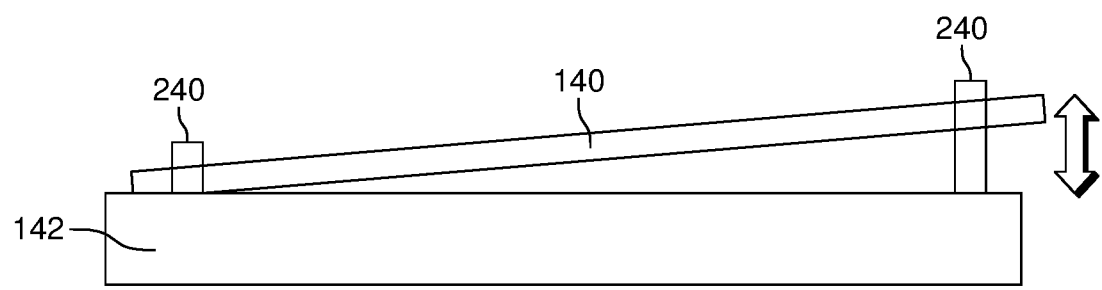

FIGS. 6A-6C illustrate various embodiments of different propensity mechanisms for adjusting the inclination of the ramp surface 122 (i.e. platform section 140-1) to provide a desired propensity input or manipulative input. FIG. 6A is a side view and FIG. 6B is a top view. In the embodiment shown in FIGS. 6A-6B, the incline of the platform 140 (or ramp section) is adjusted via a wedge 230 movable as illustrated by arrow 232 to raise and lower an elevation of edge 234 to adjust the magnitude of the incline slope. In the embodiment illustrated in FIG. 2C, the slope can be adjusted by adjusting the height elevation of the dowels 144 on one side of the frame 142 higher or lower than the other side of the frame 142. As shown in the side view of FIG. 6C, the platform 140 is coupled to the ramp structure 120 via screws 240. The elevation of the screws 240 are individually adjusted as shown in FIG. 6C to provide the adjustable incline slope. The platform 140 can be coupled to the ramp structure 120 directly via the screws 240 or can be connected to an inset which is coupled to the ramp structure as previously described.

Figure 7A:
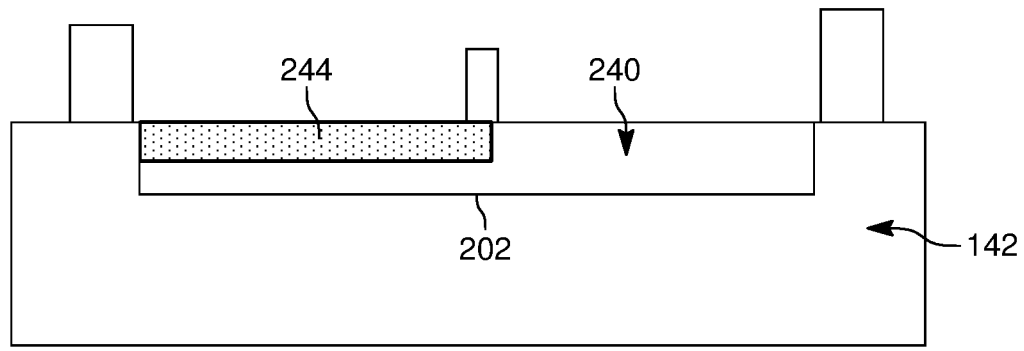
FIG. 7A illustrates an embodiment of a ramp structure with a treatment inset.
Figure 7B:
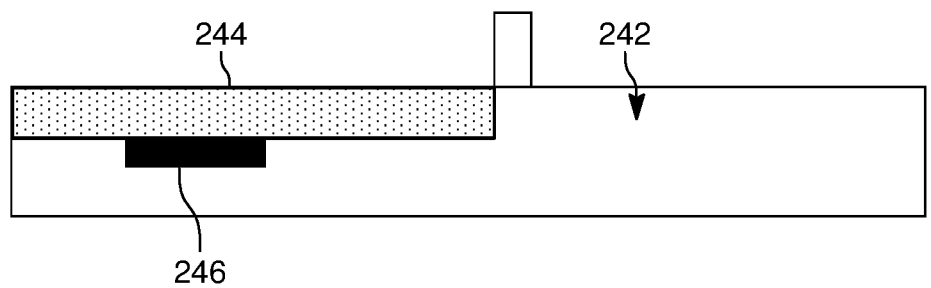
FIGS. 7B-7C illustrate embodiments of different treatment insets for a ramp structure as illustrated in FIG. 2A.
Figure 7C:
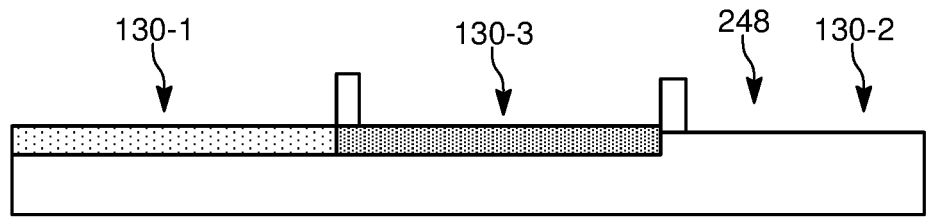

FIGS. 7A-7B illustrate embodiments of different treatment insets 240, 242 for insertion into inset cavity 202 along the ramp surface 122 or on top of platform section 140-2 to provide different treatment inputs to the subject elements 104. Each of the treatment insets shown in FIGS. 7A-7B include a treatment path 130-1 and a non-treatment or control path 130-2. In the embodiment illustrated in FIG. 7A, the treatment path 130-1 includes an increased surface friction pad 244 and in the embodiment shown in FIG. 7B, the treatment path 130-1 includes the pad 244 in addition to a magnet 246 that imparts a magnetic input in addition to the increased surface friction to provide compound treatment variables. The magnetic treatment input is applied via an embedded magnet. In an embodiment shown in FIG. 7C, the inset 248 includes multiple treatment paths 130-1, 130-3 in addition to a non-treatment path 130-2. The multiple treatment paths 130-1, 130-3 include different friction inputs or other inputs that increase or decrease momentum of the balls or subject elements. Although FIG. 7C illustrates treatment paths 130-1, 130-3, and non-treatment path 130-2, application is not limited to a particular number of paths as will be appreciated by those skilled in the art.

Figure 8A:
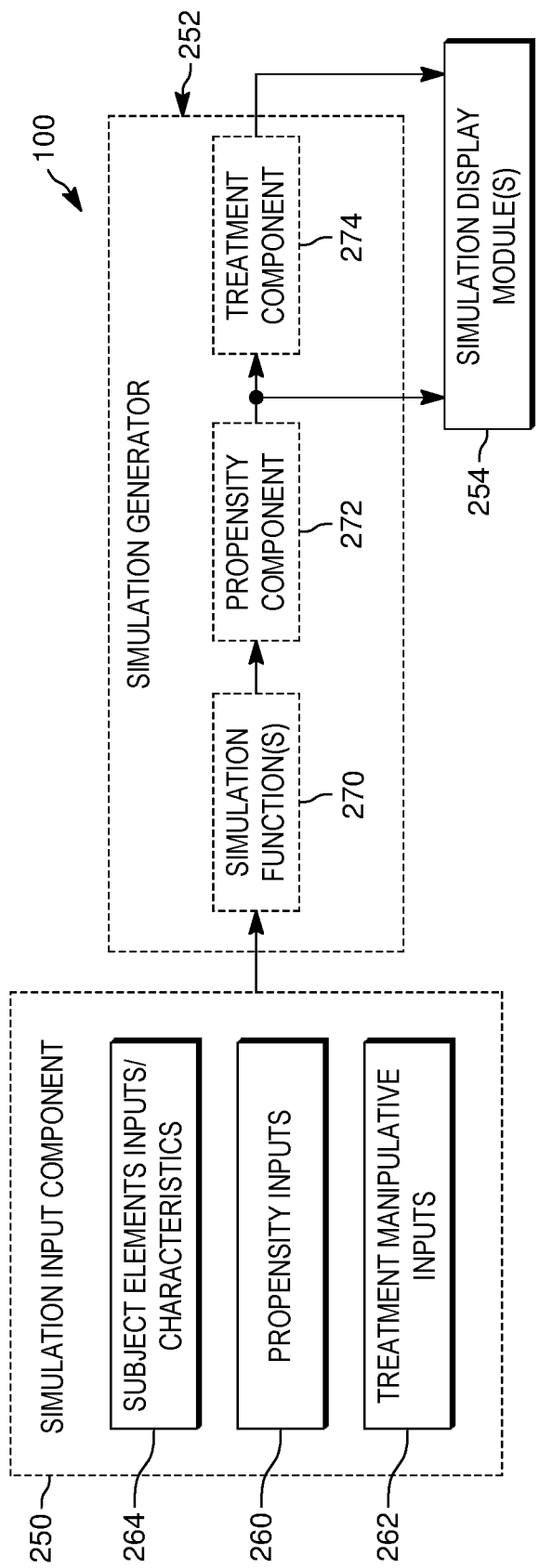
FIGS. 8A-8C illustrate an embodiment of a statistics teaching tool implemented through an applet via instructions stored on one or more data storage devices and implemented through one or more processing units.

FIG. 8A schematically illustrates an embodiment of the simulation tool 100 as an application program including instructions stored on one or more memory or data storage devices. As shown in FIG. 8A, the application tool includes a simulation input component 250, a simulation generator 252 and a graphical display module 254. As shown, the input component 250 includes selections for propensity inputs 260, treatment inputs 262 and subject elements inputs 264. As shown, the simulation generator 252 receives the inputs from the simulation input component 250 to calculate an output score or measure for different subject elements in response to the propensity, treatment and other inputs. As shown, the simulation uses simulation functions or algorithms 270 to calculate the output score or measure for subject elements 104 based upon the characteristics of the subject elements as represented below.

Output score=$f$\{characteristics of the subject element\}

In some embodiments, a propensity component 272 uses propensity algorithms to assign the subject elements to treatment or no-treatment based upon the propensity input 260. The treatment component 274 applies a treatment algorithm or multiplier to the subject elements assigned to the treatment to increase or decrease the output score or measure for the subject elements assigned to treatment based upon the treatment inputs. Additional algorithms or functions can be used to assign subject elements to treatment and apply confounding inputs to increase or decrease the output measure or distribution. The graphical display module(s) 254 uses output from the simulation generator 252 to output a graphical display of the outcome measurements of the simulation.

Figure 8B:
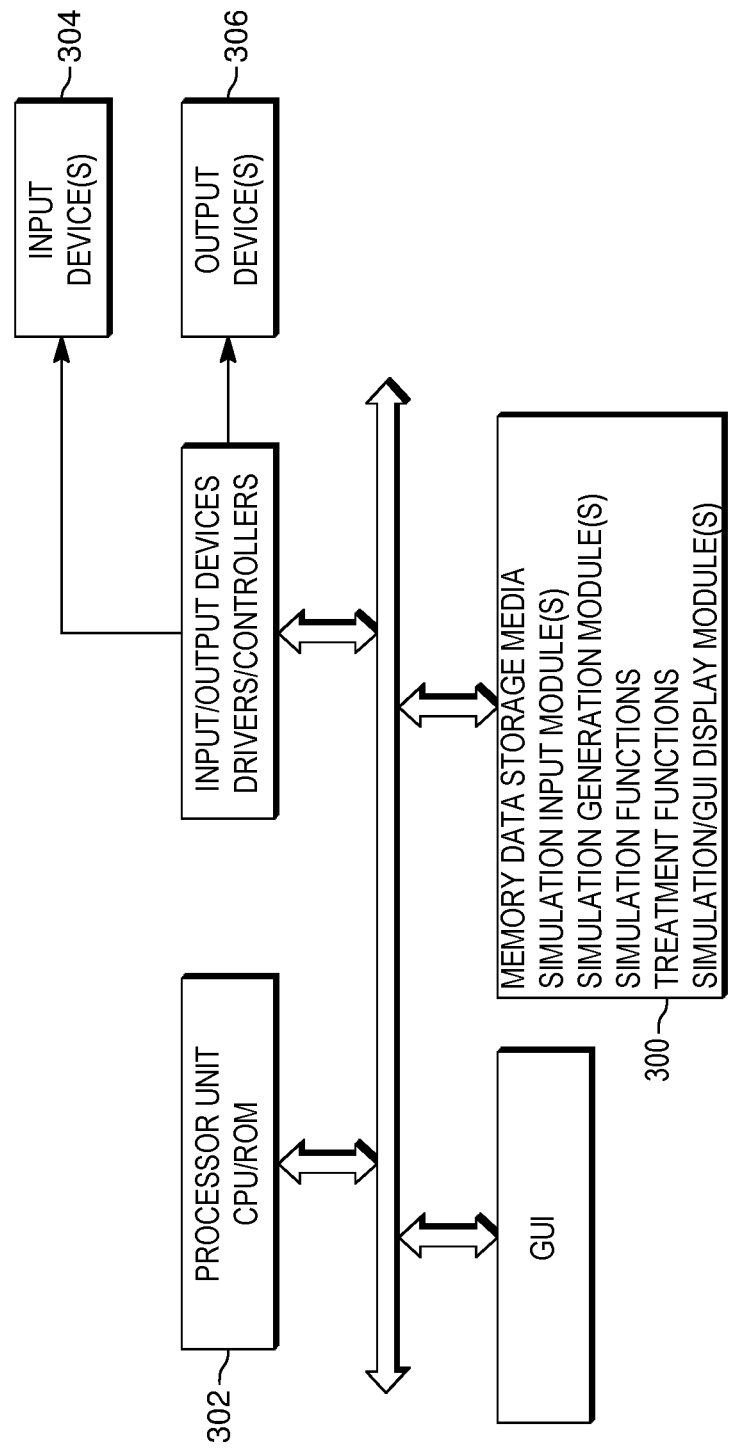

The application tool shown in FIG. 8A is implemented on a computer device including memory or data storage media 300, a processing unit 302 and input devices 304 and output devices 306 including keyboards, touch screens, pointing devices, graphical display screens or monitors as shown in FIG. 8B. The input selections 250 and simulation modules 252 are stored in the memory 300 and are implemented via the processing unit 302 to apply the treatment inputs to generate the output measurements or scores. The input selections are received through the input devices 304. The different simulation modules use mathematical functions to calculate the output measurement for the subject elements 104 responsive to the characteristics of the subject elements and the propensity and treatment inputs.

In one embodiment, the simulation generator 252 simulates the treatment inputs for balls 104 rolling on a simulated ramp structure and the output display module 254 displays a representation of the ramp structure 120 and output measurements on a representation of the ramp structure as illustrated in FIG. 2A. In particular, in an illustrated embodiment, the display modules 254 output a graphical user interface (GUI) illustrating in elapsed time the subject elements moving along the treatment and non-treatment paths and output measures or score distributions for the treated and non-treated subject elements. Although FIG. 8B illustrates modules stored on a local device, the modules and program instructions can be stored on a remote or network device and accessed through the internet or the world-wide-web.

Figure 8C:
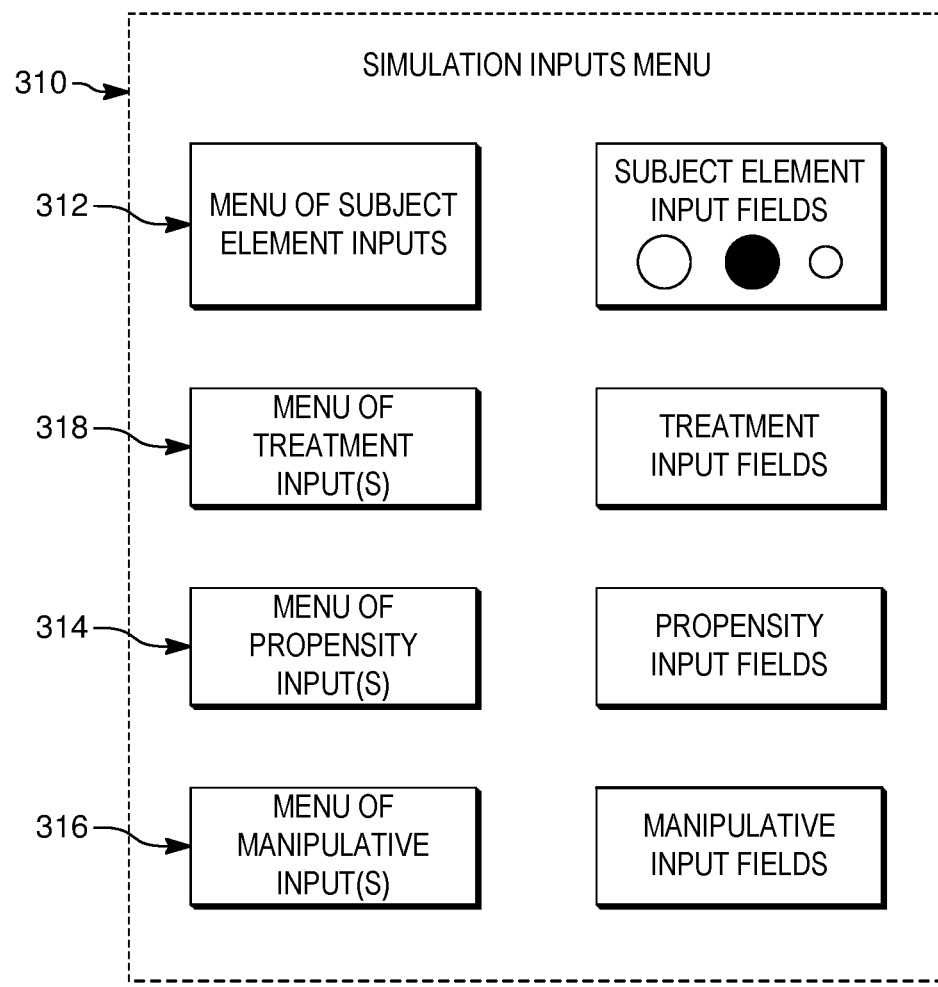

FIG. 8C illustrates a graphical user interface for the simulation input component 250. As shown, the GUI menu 310 includes a menu 312 of subject elements, propensity inputs 314, optional manipulative inputs 316 and treatment inputs 318. The graphically user interface includes input fields for the subject elements, propensity inputs, treatment inputs and manipulative inputs. The user selects subject elements, propensity and other inputs from the menus 312, 314, 316, 318. As shown, the subject elements include elements having different sizes and characteristics. The propensity inputs include a random propensity input, a biased propensity input, and menu for selecting a propensity value for individual subject elements or subgroups of subject elements. The user can also select the treatment type and magnitude as well as other inputs (or manipulative inputs) via the simulation input menus and input fields. As previously described in FIG. 8A, the simulation generator 252 utilizes simulation algorithms to assign the subject elements to treatment and algorithms to apply treatment inputs to mathematically simulate and display outcomes for selected treatment and propensity inputs.

Figure 11A:
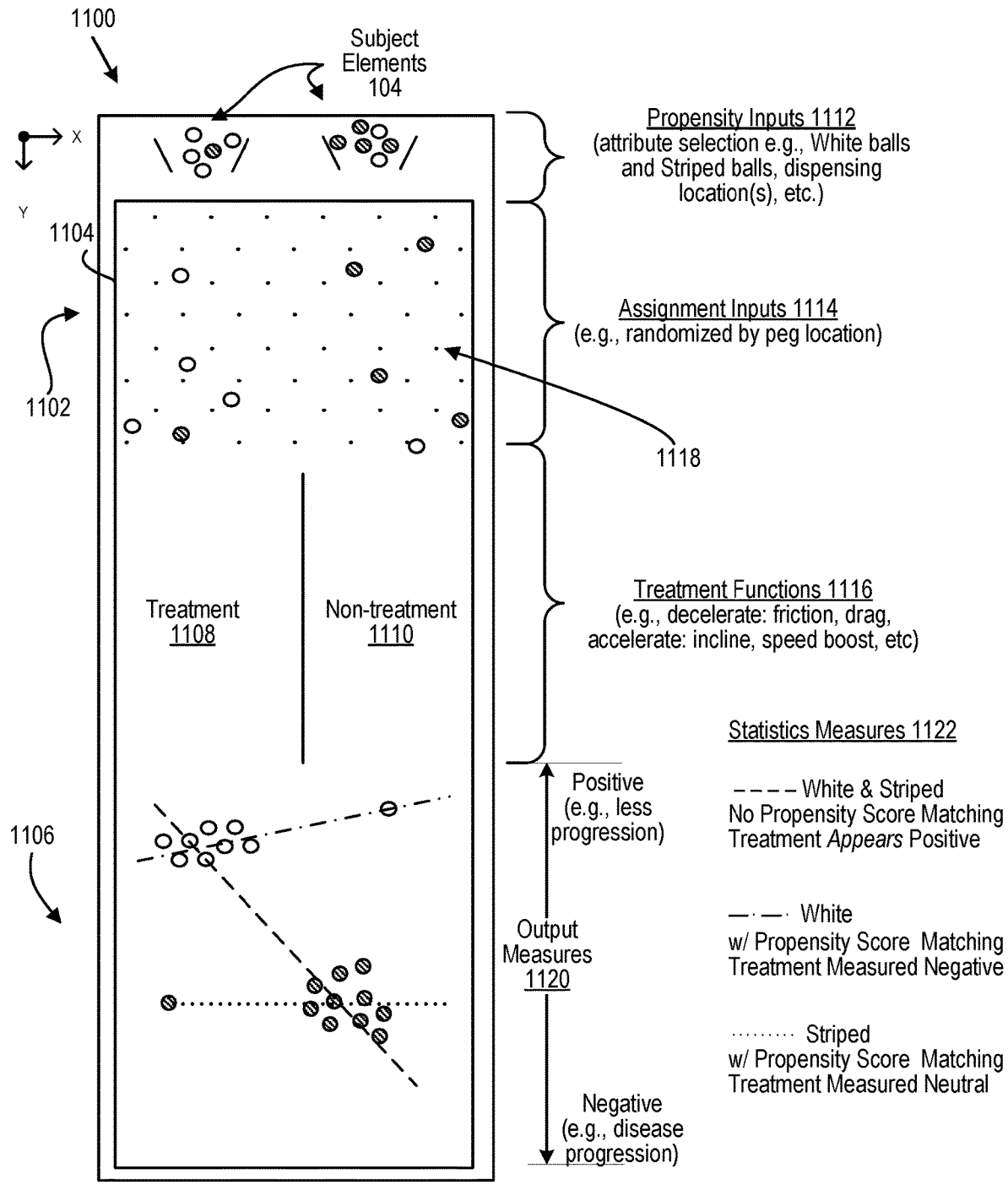
FIGS. 11A-11C are examples illustrating several embodiments of a simulation of the apparatus for teaching statistics concepts.
Figure 11B:
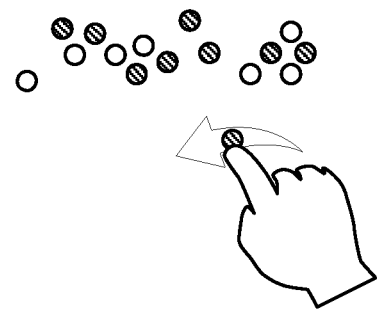
Figure 11C:
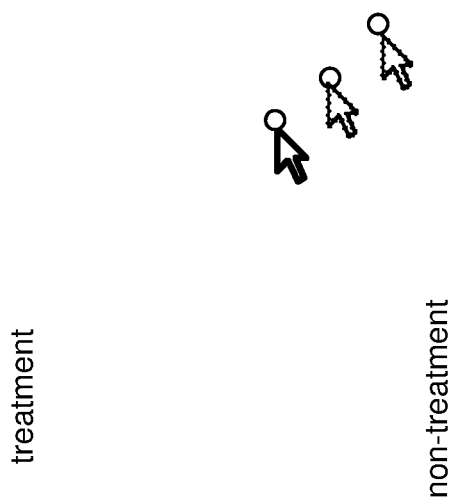

Referring now to FIGS. 9 and 11A-11C, FIG. 9 is a schematic block diagram illustrating one embodiment of an apparatus 900 for teaching statistics concepts in accordance with one embodiment of the present invention. FIGS. 11A-11C are examples illustrating several embodiments of a simulation of the apparatus 900 for teaching statistics concepts, where the simulation is displayed on a display screen 1100.

In one embodiment, the apparatus 900 includes an instructional tool apparatus 902 with a simulation module 904, propensity module 906, a treatment module 908, and a display module 910. In one embodiment, the instructional tool apparatus 902 includes a simulation module that generates a simulation of one or more subject elements 104 moving from a first portion 1102 of a simulated space 1104 to a second portion of the simulated space, where the simulated space 1104 has a treatment path and a non-treatment path. In some embodiments, the simulation is computer for display on the display screen 1100. In certain embodiments, the simulation is similar in many respects to the simulation provided by the mechanical simulation tool described above with respect to FIGS. 2A-2C, 3A-3K, 4, 5A-5C, 6A-6C, and 7A-7C.

In various embodiments, the apparatus 900 is implemented as a computer simulation which, as described above with respect to FIG. 1, provides various improvements over mechanical embodiments of the simulation tool described above. In addition to such improvements, the apparatus 900 in various embodiments, may be configured to simulate different elements of the simulation in exciting, novel, unexpected, and/or interesting ways. For example, in one embodiment, the simulation module 904 generates the simulated space as a surface having characteristics of an inclined plane similar to the ramp surface 122 described above and the one or more subject elements 104 are simulated as balls having predetermined attributes. In the embodiment, the subject elements 104 e.g., balls roll from a first portion 1102 (e.g., a top part of a simulated space 1104 that is similar to the ramp surface 122 described above with respect to a second portion 1106 of the simulated space 1104.

In other embodiments, the simulation module 904 is configured to simulate the subject elements 104 as runners running in cross-country race, asteroids hurtling through space, salmon swimming up a river, or any representation selected for a particular lesson. In certain embodiments, the simulation module 904 is configured to generate a three dimensional ("3D") simulation for display or to change between an 2D visualization and a 3D visualization in response to a user input. It may be noted that with regard to the various embodiments described herein, references to the terms "up," "down," "left," "right," "top," "bottom," and so forth, are provided merely for simplicity of referring to the Figures unless otherwise clear from context and are not generally intended to describe limitations regarding directions or orientations of the simulation or the elements in the simulation.

Additionally, in certain embodiments, the simulation module 904 may be configured to simulate elements such as the subject elements 104 as having attributes different from those normally found in the physical world. For example, gravitational effects on the simulated subject elements 104 may be programmed to increase, decrease or even be reversed (i.e., antigravity) to provide a specific, unconventional, and/or novel simulation teaching experience.

The apparatus 900 in one embodiment, includes a propensity module 906 that utilizes one or more propensity inputs 1112 to the simulation module to affect a propensity of the one or more subject elements e.g., 104 to be assigned to move on the treatment path e.g., 1108 to have one or more treatment functions applied. As used herein, the term propensity refers to the probability of something e.g., a subject element such as a ball, being assigned to a particular treatment given a set of observed covariates. The term propensity input as used herein refers to an input to the simulation that affects the propensity of the subject elements e.g., 104 of the simulation being assigned to a particular treatment e.g., the one or more treatment functions applied in the treatment path e.g., 1108.

In certain embodiments, the propensity inputs 1112 substantially similar to the propensity inputs 106, 260, 314 or other propensity inputs described herein. For example, in some embodiments, the propensity inputs 1112 are user selectable. In some embodiments, the user selectable propensity inputs 1112 may include one or more of a random propensity input, a biased propensity input, and/or a selectable propensity input for the one or more subject elements e.g., 104. In some embodiments, the propensity inputs include attributes which may be selected for the one or more subject elements 104. In other embodiments, the propensity inputs 1112 include selecting a dispensing location from which to begin movement of the subject elements 104 from the first portion 1102 of the simulated space 1104 to the second portion 1106 of the simulated space 1104.

In some embodiments, the propensity inputs 1112 may include assignment inputs 1114 that affect the propensity of the subject elements 104 to move on the treatment path 1108 or the nontreatment path 1110. For example, in one embodiment, the assignment inputs 1114 include an array of simulated pegs 1118 having an alternating offset pattern that imparts at least some randomization to a horizontal movement of the one or more subject elements 104 towards the treatment path 1108 or the nontreatment path 1110.

Referring again to FIGS. 9 and 11A, in one embodiment, apparatus 900 includes a treatment module 908 that applies the one or more treatment functions e.g., 1116 to the one or more subject elements 104 moving on the treatment path 1108, where the one or more treatment functions 1116 are configured to affect at least one output measure 1120 of the one or more subject elements 104. In certain embodiments, the at least one output measure includes at least one of an output distance and a score distribution. In other words, the output distance refers to the distance that the subject, 104 travels after traveling on the treatment path 1108 or the nontreatment path 1110.

In some embodiments, a simulated ending position of the one or more subject elements 104 in the at least one output measure is related to a simulated efficacy of the one or more treatment functions. For example, as depicted in FIG. 11A, the output measures 1120 are simulated as being more positive when the output distance is less and more negative when the output distance is greater. Thus, if the output distance represents progression towards a negative disease outcome, a positive output measure 1120 may be one that indicates less progression towards a negative disease outcome. In contrast, a negative output measure 1120 may be one that indicates more progression towards the negative disease outcome. In various embodiments, the direction and meaning of the output distance of the output measures 1120 is definable by a user within the simulation.

In various embodiments, the one or more treatment functions e.g., 1116 may be simulated as being analogous to treatment mechanisms 134 described above with respect to FIG. 2A, 2D-2F, 3D, 3F, 3H-3J, etc., to affect the momentum and/or the output distance, or score of the subject element balls e.g., 104 to reduce the output distance of the subject elements 104 compared to the non-treatment path which has no increased surface friction relative to the surface of the ramp.

In other embodiments, the treatment functions 1116 may be simulated as other types of influences. For example, the treatment functions may be drag on the subject elements 104 moving in a fluid medium due to the viscosity of the fluid medium.

Referring also now to FIGS. 11B and 11C, In certain embodiments, the one or more treatment functions 1116 are applied to the one or more moving subject elements in response to a user action performed on the one or more moving subject elements. In some embodiments, the user action may also be used to provide one or more propensity inputs 1112. For example, as illustrated in FIG. 11B, in one embodiment, a user action such as a swipe left performed on a subject element 104 e.g., ball may change the propensity of the ball to move on the treatment path 1108 and to have one or more treatment functions 1116 applied.

In other embodiments, as illustrated in FIG. 11C a user action such as a touchscreen tap on a subject element 104 e.g., ball, may apply the one of the one or more treatment functions 1116 to the subject element 104. Successive touchscreen taps on a subject element 104 could be programmed to cause the outcome measure distance shown here as a vertical distance to increase by a predetermined amount. Similarly, each touchscreen could cause the subject element 104 to move from a nontreatment path toward a treatment path and successive steps. This could be depicted in the simulation as movements in a horizontal direction. In various embodiments, the user actions may include any action that can be performed by a user using a user interface, such as for example, a swipe, a mouse click, a touchscreen tap, a touchscreen swipe, a voice input, etc.

In certain embodiments, the apparatus 900 includes a display module 910 that displays the simulation of the one or more subject elements e.g., 104 having the propensity inputs 1112 applied, an application of the one or more treatment functions 1116, and the at least one output measure 1120, as depicted in FIG. 11A.

In various embodiments, at least a portion of the modules (e.g., simulation module 904, propensity module 906, treatment module 908, and display module 910) comprises one or more of hardware circuits, a programmable hardware device and executable code, the executable code stored on one or more computer readable storage media.

Figure 9:
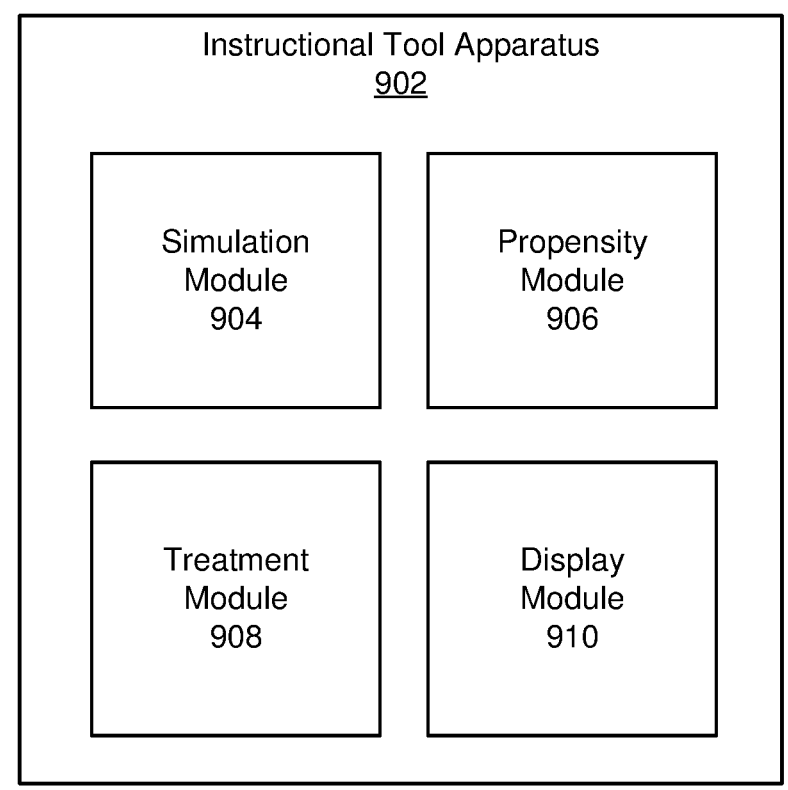
FIG. 9 is a schematic block diagram illustrating one embodiment of an apparatus for teaching statistics concepts.
Figure 10:
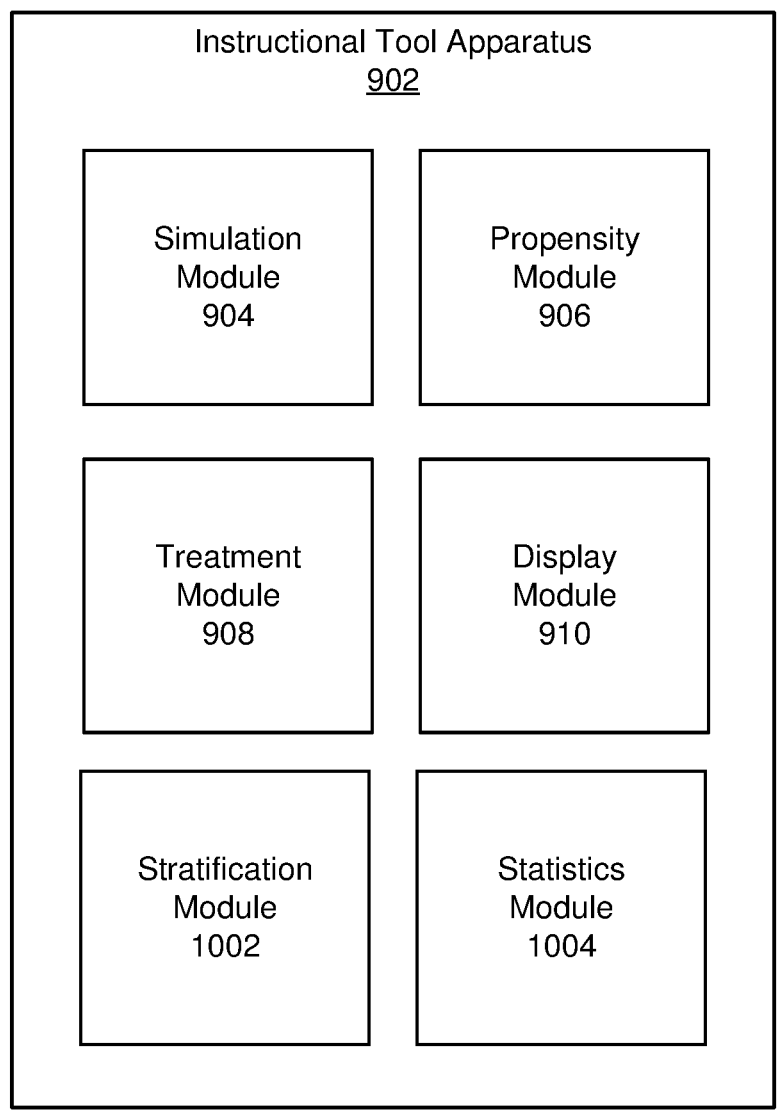
FIG. 10 is a schematic block diagram illustrating another embodiment of an apparatus for teaching statistics concepts.

FIG. 10 is a schematic block diagram illustrating one embodiment of an apparatus 1000 for teaching statistics concepts in accordance with one embodiment of the present invention. In one embodiment, the apparatus 1000 includes an instructional tool apparatus 902, simulation module 904, propensity module 906, a treatment module 908, and a display module 910 substantially as described above with respect to the apparatus 900 depicted in FIG. 9.

The apparatus 1000 further includes a stratification module 1002 and a statistic module 1004 which are described below. In one embodiment, the stratification module 1002 groups the one or more subject elements 104 into matched groups based on the one or more propensity inputs 1116 of the subject elements 104 within a subgroup substantially matching. For example, referring again to FIG. 11A, the white balls depicted in FIG. 11A may be programmed in the simulation to be slower and to have a higher propensity to move on the treatment path 1108 and to receive the treatment functions 1116. Thus, the stratification module 1002, in one embodiment, groups the white balls into a substantially homogeneous subgroup based on the propensity inputs 1116 of slowness. Similarly, the striped balls be programmed in the simulation be faster and have a lower density to move on the treatment path. Accordingly, the stratification module 1002 groups the striped balls into a second homogeneous subgroup based on the propensity input 1116 of vastness.

For example, if a treatment function 1116 is applied by a user clicking on a ball, then faster moving balls will likely have a lower propensity to be treated because it is harder for the user to perform the user action of clicking on a fast ball. Likewise, if the user action merely nudges port guides one of the subject elements 104 towards the treatment path 1108, a user may more easily perform such a user action on a slow white ball than on a fast striped ball. In certain embodiments, the stratification module 1002 enables propensity matching, also referred to as propensity score matching, to be performed substantially as described above.

In various embodiments, the apparatus 1000 further includes a statistics module 1004 that computes and/or displays one or more statistics measures 1122 for the at least one output measure 1120 of the one or more subject elements 104, where the statistics module 1004 is configured to selectively compute and display the statistics measures for the matched groups e.g., using propensity matching or propensity score matching. For example, has depicted in FIG. 11A, the statistics measured for the white and striped balls together when no propensity score matching is applied appears to indicate that the treatment is positive i.e. the striped balls which went through the nontreatment path 1110 had a greater output distance i.e. progressed farther toward the negative disease outcome than the white balls receiving treatment.

However, after the stratification module 1002 groups the white balls into a substantially homogeneous subgroup having substantially matching propensity inputs (e.g., white, slow) and the striped balls into a second substantially homogeneous subgroup having substantially matching propensity inputs (e.g., striped, fast) the statistics module 1004 calculates and displays statistics measures such as regression lines for the outputs of the white slow subgroup and the striped fast subgroup.

As can be seen in FIG. 11A, using propensity score matching, the treatment functions 1116 performed in the treatment path 1108 the larger set of white balls in the subgroup appears not to have slowed momentum or shortened progression of the larger set of white balls when compared to the single white ball that traveled on the nontreatment path 1110. Similarly, with propensity score matching on the fast striped balls, the statistics module 1004 calculates and displays statistics such as a regression line showing that the treatment measured neutral, or in other words the trend of the striped balls is to have the same average distance whether the balls moved through the treatment path 1108 or the nontreatment path 1110.

Figure 12:
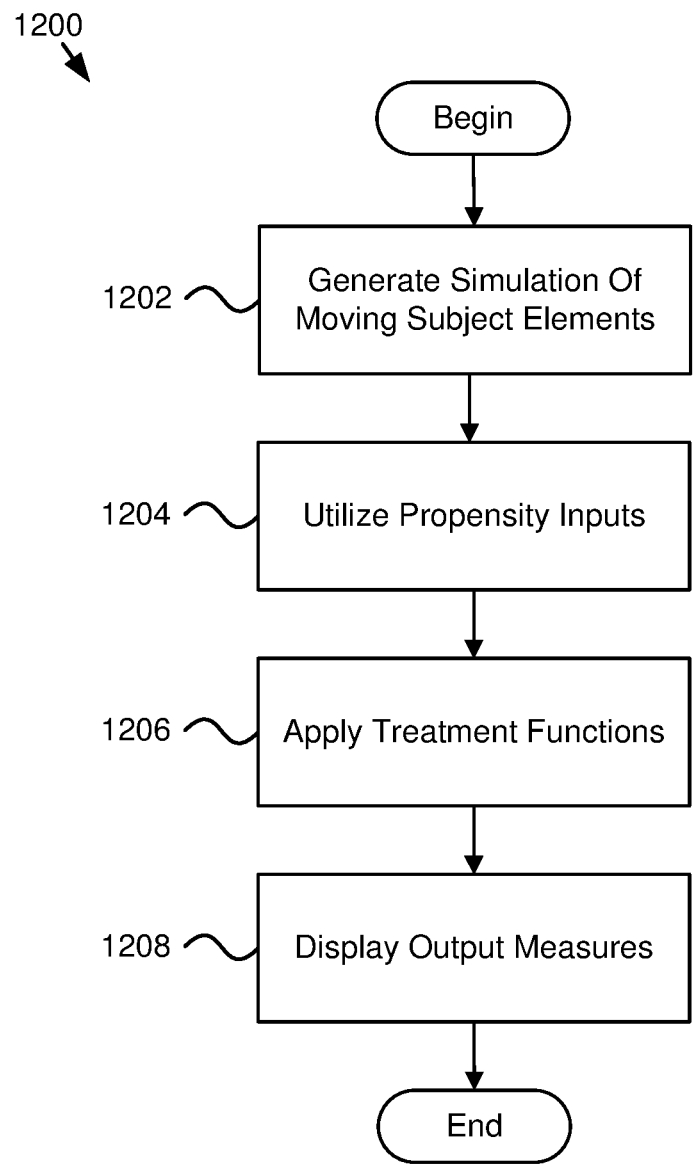
FIG. 12 is a flowchart diagram illustrating one embodiment of a method for generating and displaying a simulation for teaching statistics concepts.

FIG. 12 is a flowchart diagram illustrating one embodiment of a method 1200 for generating and displaying a simulation for teaching statistics concepts. In one embodiment, the method 1200 begins and generates 1202 a simulation of one or more subject elements moving from a first portion of a simulated surface to a second portion of the simulated surface, where the simulated surface has a treatment path and a non-treatment path. The method 1200 continues and utilizes 1204 one or more propensity inputs to affect a propensity of the one or more subject elements to move on the treatment path to have one or more treatment functions applied. The method 1200 continues and applies 1206 the one or more assigned treatment functions to the one or more subject elements moving on the treatment path, where the one or more assigned treatment functions are configured to affect at least one output measure of the one or more subject elements. The method 1200 continues and displays the simulation of the one or more subject elements having the propensity inputs applies, application of the one or more treatment functions, and the at least one output measure and the method 1200 ends. All or portions of the steps of the method 1200 may be implemented using the simulation module 904, the propensity module 906, the treatment module 908, and/or the display module 910.

Figure 13:
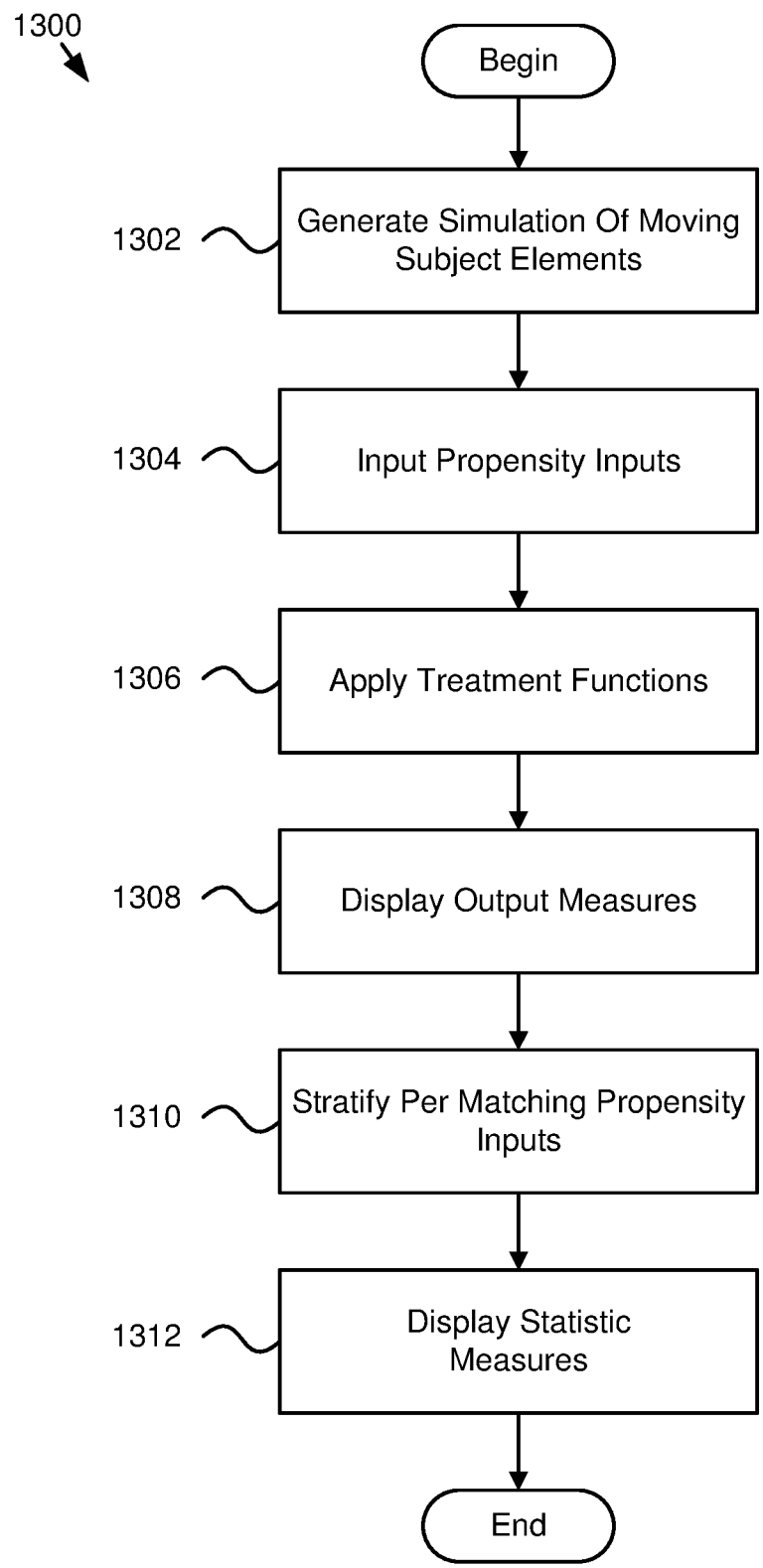
FIG. 13 is a flowchart diagram illustrating another embodiment of a method for generating and displaying a simulation for teaching statistics concepts.

FIG. 13 is a flowchart diagram illustrating another embodiment of a method 1300 for generating and displaying a simulation for teaching statistics concepts. In some embodiments, the method 1300 is substantially similar to the method 1200 described above with respect to FIG. 12. In certain embodiments, the method 1300 begins and generates 1302 a simulation of one or more subject elements moving from a first portion of a simulated surface to a second portion of the simulated surface, where the simulated surface has a treatment path and a non-treatment path. In certain embodiments of the method 1200, the simulated space has characteristics of an inclined plane and the one or more subject elements are simulated as balls having predetermined attributes substantially as described above with respect to apparatuses 900 and 1000 that are depicted in FIGS. 9 and 10.

In various embodiments, the method 1300 continues and utilizes 1304 one or more propensity inputs to affect a propensity of the one or more subject elements to move on the treatment path to have one or more treatment functions applied. In some embodiments, the propensity inputs comprise one or more attributes that affect the propensity of the one or more subject elements to move along the treatment path.

In some embodiments, the method 1300 continues and applies 1306 the one or more assigned treatment functions to the one or more subject elements moving on the treatment path, where the one or more assigned treatment functions are configured to affect at least one output measure of the one or more subject elements. In certain embodiments, the method 1300 applies the one or more treatment functions to the one or more moving subject elements in response to a user action performed on the one or more moving subject elements. In various embodiments, the user action is selected from a mouse click, a touchscreen tap, a touchscreen gesture, a voice input, etc.

In one embodiment, the method 1300 continues and displays the simulation of the one or more subject elements having the propensity inputs applies, application of the one or more treatment functions, and the at least one output measure. In various embodiments, the method 1300 continues and stratifies 1310 the one or more subject elements into substantially homogeneous subgroups based on the one or more attributes substantially matching. In certain embodiments, the method 1300 displays 1312 one or more statistics measures for the at least one output measure of the one or more subject elements, wherein the statistics module is configured to selectively compute and display the statistics measures for the subgroups.

All or portions of the steps of the method 1200 may be implemented using the simulation module 904, the propensity module 906, the treatment module 908, the display module 910, the stratification module 1002, and/or the statistic module 1004.

In one embodiment, all or portions of the steps of the methods 1200 and 1300 may be implemented in a computer program product for teaching statistics concepts. In one embodiment, the computer program product includes a computer readable storage medium having program instructions embodied therewith, where the program instructions are executable by a processor to cause the processor to generate a simulation of one or more subject elements moving from a first portion of a simulated surface to a second portion of the simulated surface, where the simulated surface has a treatment path and a non-treatment path. In various embodiments, the program instructions are executable by the processor to cause the processor to utilize one or more propensity inputs to affect a propensity of the one or more subject elements to move on the treatment path to have one or more treatment functions applied.

In certain embodiments, the program instructions are executable by the processor to cause the processor to apply the one or more assigned treatment functions to the one or more subject elements moving on the treatment path, where the one or more assigned treatment functions are configured to affect at least one output measure of the one or more subject elements and to display the simulation of the one or more subject elements having the propensity inputs applied, application of the one or more treatment functions, and the at least one output measure.

Appreciated by those skilled in the art, application of the features of the present invention is not limited to the particular embodiments of the in certain embodiments, present application and different embodiments can be used to implement features described in the present application. Furthermore, elements or components described herein can be used in different combinations to simulate different statistics models or data patterns. It should be understood that the Figures of the application are illustrative and are not necessarily drawn to scale. Other embodiments of the device include different confounding inputs or manipulative devices that impart different inputs to increase or decrease momentum as described and application is not limited to the particular propensity input mechanisms shown.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for teaching statistics concepts comprising;
    a simulation module that generates a simulation of one or more subject elements moving from a first portion of a simulated space to a second portion of the simulated space, wherein the simulated space has a treatment path and a non-treatment path;
    a propensity module that utilizes one or more propensity inputs to the simulation module to affect a propensity of the one or more subject elements to move on the treatment path to have one or more treatment functions applied;
    a treatment module that applies the one or more treatment functions to the one or more subject elements moving on the treatment path, wherein the one or more treatment functions are configured to affect at least one output measure of the one or more subject elements; and
    a display module that displays the simulation of the one or more subject elements having the propensity inputs applied, application of the one or more treatment functions, and the at least one output measure,
    wherein at least a portion of said modules comprises one or more of hardware circuits, a programmable hardware device and executable code, the executable code stored on one or more computer readable storage media.

2. The apparatus of claim 1, wherein the simulation module generates the simulated space as a surface having characteristics of an inclined plane and wherein the one or more subject elements are simulated as balls having predetermined attributes.

3. The apparatus of claim 2, wherein the propensity inputs comprise an array of simulated pegs on the simulated surface having an alternating offset pattern that imparts at least some randomization to a horizontal movement of the one or more subject elements.

4. The apparatus of claim 1, wherein the treatment module simulates one or more treatment functions as characteristics of at least part of the treatment path that affect a simulated momentum of the one or more subject elements.

5. The apparatus of claim 1, wherein the propensity inputs comprise one or more attributes that affect the propensity of the one or more subject elements to move along the treatment path.

6. The apparatus of claim 5, further comprising a stratification module, that stratifies a population of the one or more subject elements into substantially homogeneous subgroups based on the one or more propensity inputs of the subject elements within a subgroup substantially matching.

7. The apparatus of claim 6, further comprising a statistics module that displays one or more statistics measures for the at least one output measure of the one or more subject elements, wherein the statistics module is configured to selectively compute and display the statistics measures for the subgroups.

8. The apparatus of claim 1 wherein the at least one output measure comprises at least one of an output distance and a score distribution.

9. The apparatus of claim 1 wherein a simulated ending position of the one or more subject elements in the at least one output measure is related to a simulated efficacy of the one or more treatment functions.

10. The apparatus of claim 1, wherein the one or more treatment functions are applied to the one or more moving subject elements in response to a user action performed on the one or more moving subject elements.

11. The apparatus of claim 10, wherein the user action is selected from a mouse click, a touchscreen tap, a touchscreen gesture, a voice input, and combinations thereof.

12. A method for teaching statistics concepts comprising;
generating a simulation of one or more subject elements moving from a first portion of a simulated surface to a second portion of the simulated surface, wherein the simulated surface has a treatment path and a non-treatment path;
utilizing one or more propensity inputs to affect a propensity of the one or more subject elements to move on the treatment path to have one or more treatment functions applied;
applying the one or more assigned treatment functions to the one or more subject elements moving on the treatment path, wherein the one or more assigned treatment functions are configured to affect at least one output measure of the one or more subject elements; and
displaying the simulation of the one or more subject elements having the propensity inputs applied, application of the one or more treatment functions, and the at least one output measure.

13. The method of claim 12, wherein the simulated space comprises characteristics of an inclined plane and wherein the one or more subject elements are simulated as balls having predetermined attributes.

14. The method of claim 13, wherein the propensity inputs comprise an array of simulated pegs on the simulated surface having an alternating offset pattern that imparts at least some randomization to a horizontal movement of the one or more subject elements.

15. The method of claim 12, wherein the one or more treatment functions are applied to the one or more moving subject elements in response to a user action performed on the one or more moving subject elements.

16. The method of claim 15, wherein the user action is selected from a mouse click, a touchscreen tap, a touchscreen gesture, a voice input, and combinations thereof.

17. The method of claim 12, wherein the one or more treatment functions are simulated as characteristics of at least part of the treatment path that affect a simulated momentum of the one or more subject elements.

18. The method of claim 12, wherein the propensity inputs comprise one or more attributes that affect the propensity of the one or more subject elements to move along the treatment path.

19. The method of claim 18, further comprising stratifying the one or more subject elements into substantially homogeneous subgroups based on the one or more attributes substantially matching.

20. A computer program product for teaching statistics concepts, the computer program product comprising a computer readable storage medium having program instructions embodied therewith, wherein the program instructions are executable by a processor to cause the processor to:
generate a simulation of one or more subject elements moving from a first portion of a simulated surface to a second portion of the simulated surface, wherein the simulated surface has a treatment path and a non-treatment path;
utilize one or more propensity inputs to affect a propensity of the one or more subject elements to move on the treatment path to have one or more treatment functions applied;
apply the one or more assigned treatment functions to the one or more subject elements moving on the treatment path, where the one or more assigned treatment functions are configured to affect at least one output measure of the one or more subject elements; and
display the simulation of the one or more subject elements having the propensity inputs applied, application of the one or more treatment functions, and the at least one output measure.

* * * * *